United States Patent
Islam et al.

(10) Patent No.: US 11,032,823 B2
(45) Date of Patent: Jun. 8, 2021

(54) INFORMING BASE STATION REGARDING USER EQUIPMENT'S RECEPTION OF BEAM CHANGE INSTRUCTION

(71) Applicant: QUALCOMM Incorporated, San Diego, CA (US)

(72) Inventors: Muhammad Nazmul Islam, Littleton, MA (US); Tao Luo, San Diego, CA (US); Sony Akkarakaran, Poway, CA (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/866,489

(22) Filed: May 4, 2020

(65) Prior Publication Data

US 2020/0267733 A1 Aug. 20, 2020

Related U.S. Application Data

(63) Continuation of application No. 15/400,446, filed on Jan. 6, 2017, now Pat. No. 10,687,335.
(Continued)

(51) Int. Cl.
*H04W 72/04* (2009.01)
*H04B 7/06* (2006.01)
(Continued)

(52) U.S. Cl.
CPC ...... *H04W 72/0466* (2013.01); *H04B 7/0617* (2013.01); *H04L 5/0048* (2013.01);
(Continued)

(58) Field of Classification Search
CPC .......... H04W 72/0466; H04W 72/042; H04W 72/046; H04W 72/085; H04W 72/14;
(Continued)

(56) References Cited

U.S. PATENT DOCUMENTS 8,483,076 B2 7/2013 Zhang
8,526,374 B2 9/2013 Damnjanovic et al.
(Continued)

FOREIGN PATENT DOCUMENTS

CN 107852212 A 3/2018
WO 2010022075 A1 2/2010
(Continued)

OTHER PUBLICATIONS

Taiwan Search Report—TW106115947—TIPO—dated Aug. 28, 2020.
(Continued)

*Primary Examiner* — Kiet Tang
(74) *Attorney, Agent, or Firm* — Procopio, Cory, Hargreaves & Savitch LLP

(57) ABSTRACT

In a process of beam change, the base station transmits a beam change instruction to a user equipment to confirm a change from a current beam to another beam. The base station determines to change from a first beam to a second beam. The base station generates a beam change instruction to indicate the determination to change from the first beam to the second beam. The base station transmits, to a UE, the beam change instruction in a downlink control information (DCI). The base station determines whether or not the beam change instruction is detected by the UE.

30 Claims, 15 Drawing Sheets

Related U.S. Application Data

(60) Provisional application No. 62/348,829, filed on Jun. 10, 2016.

(51) Int. Cl.
*H04L 5/00* (2006.01)
*H04W 72/08* (2009.01)
*H04W 72/14* (2009.01)
*H04W 88/02* (2009.01)
*H04W 88/08* (2009.01)

(52) U.S. Cl.
CPC ....... *H04W 72/042* (2013.01); *H04W 72/046* (2013.01); *H04W 72/085* (2013.01); *H04W 72/14* (2013.01); *H04B 7/0695* (2013.01); *H04W 88/02* (2013.01); *H04W 88/08* (2013.01)

(58) Field of Classification Search
CPC .... H04W 88/02; H04W 88/08; H04B 7/0617; H04B 7/0695; H04L 5/0048
See application file for complete search history.

(56) References Cited

U.S. PATENT DOCUMENTS

| | | | |
|---|---|---|---|
| 8,594,053 B2 | 11/2013 | Kim et al. | |
| 8,737,296 B2 | 5/2014 | Palanki et al. | |
| 9,319,896 B2 | 4/2016 | Liu et al. | |
| 9,820,273 B2 | 11/2017 | Zhang et al. | |
| 2007/0161407 A1 | 7/2007 | Hovers et al. | |
| 2013/0040684 A1 | 2/2013 | Yu et al. | |
| 2013/0051364 A1 | 2/2013 | Seol et al. | |
| 2013/0121185 A1 | 5/2013 | Li et al. | |
| 2013/0286960 A1 | 10/2013 | Li et al. | |
| 2014/0016596 A1 | 1/2014 | Kim et al. | |
| 2015/0036625 A1* | 2/2015 | Nam .................. | H04L 5/0051 370/329 |
| 2015/0049824 A1 | 2/2015 | Kim et al. | |
| 2015/0282148 A1* | 10/2015 | Le ..................... | H04W 72/0406 370/329 |
| 2015/0341095 A1 | 11/2015 | Yu et al. | |
| 2016/0080058 A1 | 3/2016 | Kang et al. | |
| 2016/0183234 A1 | 6/2016 | Sung et al. | |
| 2016/0337056 A1 | 11/2016 | Frenne et al. | |
| 2017/0207843 A1* | 7/2017 | Jung .................. | H04B 7/0695 |
| 2017/0302341 A1* | 10/2017 | Yu ..................... | H04W 72/0446 |
| 2017/0359826 A1 | 12/2017 | Islam et al. | |
| 2018/0041261 A1* | 2/2018 | Modarres Razavi ....................... | H04B 7/0656 |
| 2019/0013857 A1 | 1/2019 | Zhang et al. | |

FOREIGN PATENT DOCUMENTS

| | | |
|---|---|---|
| WO | 2010030935 A3 | 3/2010 |
| WO | 2010048440 A1 | 4/2010 |
| WO | 2011109544 A1 | 9/2011 |
| WO | 2015157565 A1 | 10/2015 |

OTHER PUBLICATIONS

International Search Report and Written Opinion—PCT/US2017/032693—ISA/EPO—dated Sep. 27, 2017.
Partial International Search Report—PCT/US2017/032693—ISA/EPO—dated Aug. 7, 2017.

* cited by examiner

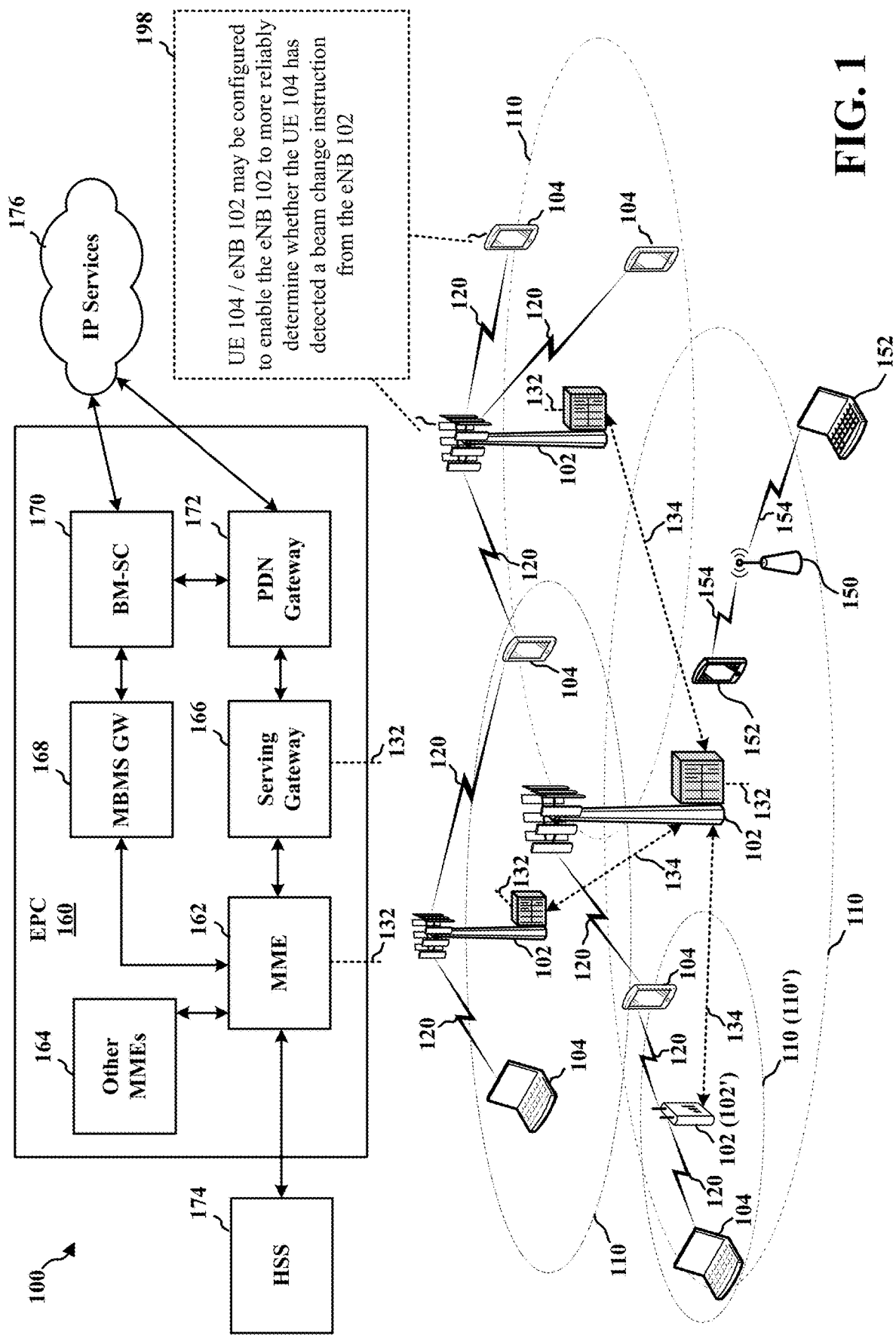

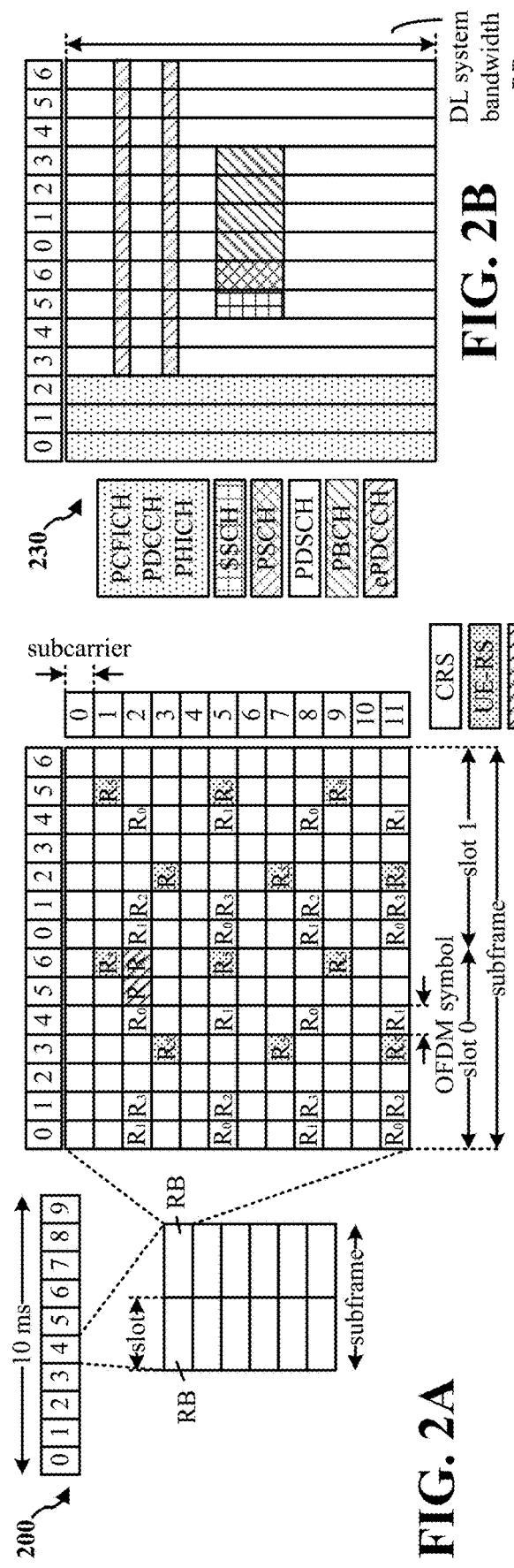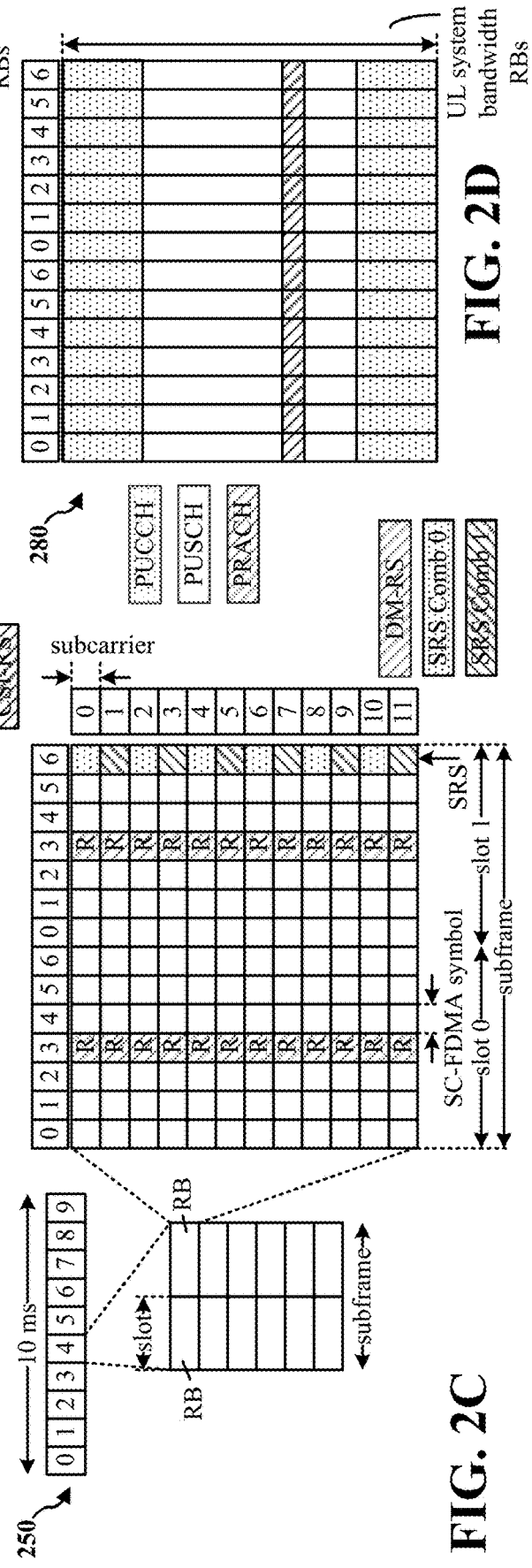

INFORMING BASE STATION REGARDING USER EQUIPMENT'S RECEPTION OF BEAM CHANGE INSTRUCTION

CROSS-REFERENCE TO RELATED APPLICATION(S)

This application is a continuation of U.S. application Ser. No. 15/400,446, entitled "INFORMING BASE STATION REGARDING USER EQUIPMENT'S RECEPTION OF BEAM CHANGE INSTRUCTION" and filed on Jan. 6, 2017, which claims the benefit of U.S. Provisional Application Ser. No. 62/348,829, entitled "INFORMING BASE STATION REGARDING USER EQUIPMENT'S RECEPTION OF BEAM CHANGE INSTRUCTION" and filed on Jun. 10, 2016, the entire contents of both of which are expressly incorporated by reference herein in their entirety.

BACKGROUND

Field

The present disclosure relates generally to communication systems, and more particularly, to a beam change in wireless communication between a user equipment and a base station.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

With a beam-forming technique, a base station may select one of beams pointing to different directions to communicate the selected beam. After selection of the beam, an optimal beam may change, and thus the base station may determine to change from a current beam to another beam. In a process of beam change, the base station transmits a beam change instruction to a user equipment to confirm a change from a current beam to another beam. However, an indication about a user equipment (UE) successfully detecting the beam change instruction may be interfered by a process involving a CRC.

In an aspect of the disclosure, a method, a computer-readable medium, and an apparatus are provided. The apparatus may be a base station. The base station determines to change from a first beam to a second beam. The base station generates a beam change instruction to indicate the determination to change from the first beam to the second beam. The base station transmits, to a UE, the beam change instruction in a downlink control information (DCI). The base station determines whether or not the beam change instruction is detected by the UE.

In an aspect, the apparatus may be a base station. The base station includes means for determining to change from a first beam to a second beam. The base station includes means for generating a beam change instruction to indicate the determination to change from the first beam to the second beam. The base station includes means for transmitting, to a UE, the beam change instruction in a DCI. The base station includes means for determining whether or not the beam change instruction is detected by the UE.

In an aspect, the apparatus may be a base station including a memory and at least one processor coupled to the memory. The at least one processor is configured to: determine to change from a first beam to a second beam, generate a beam change instruction to indicate the determination to change from the first beam to the second beam, transmit, to a UE, the beam change instruction in a DCI, and determine whether or not the beam change instruction is detected by the UE.

In an aspect, a computer-readable medium storing computer executable code for a base station includes code to: determine to change from a first beam to a second beam, generate a beam change instruction to indicate the determination to change from the first beam to the second beam, transmit, to a UE, the beam change instruction in a DCI, and determine whether or not the beam change instruction is detected by the UE.

In another aspect of the disclosure, a method, a computer-readable medium, and an apparatus are provided. The apparatus may be a base station. The base station transmits a beam change instruction in a DCI using a first beam. The base station receives a first sample signal using the first beam. The base station receives a second sample signal using a second beam indicated by the beam change instruction. The base station selects one of the first beam and the second beam based on the first sample signal and the second sample signal.

In an aspect, the apparatus may be a base station. The base station includes means for transmitting a beam change instruction in a DCI using a first beam. The base station includes means for receiving a first sample signal using the first beam. The base station includes means for receiving a second sample signal using a second beam indicated by the beam change instruction. The base station includes means for selecting one of the first beam and the second beam based on the first sample signal and the second sample signal.

In an aspect, the apparatus may be a base station including a memory and at least one processor coupled to the memory. The at least one processor is configured to: transmit a beam change instruction in a DCI using a first beam, receive a first sample signal using the first beam, receive a second sample signal using a second beam indicated by the beam change instruction, and select one of the first beam and the second beam based on the first sample signal and the second sample signal.

In an aspect, a computer-readable medium storing computer executable code for a base station includes code to: transmit a beam change instruction in a DCI using a first beam, receive a first sample signal using the first beam, receive a second sample signal using a second beam indicated by the beam change instruction, and select one of the first beam and the second beam based on the first sample signal and the second sample signal.

In another aspect of the disclosure, a method, a computer-readable medium, and an apparatus are provided. The apparatus may be a UE. The UE receives a DCI from a base station. The UE determines whether a beam change instruction is detected in the DCI. The UE indicates via an uplink transmission which is associated with the DCI whether the beam change instruction is detected, the uplink transmission including at least one of a physical uplink control channel (PUCCH) or a physical uplink shared channel (PUSCH). The UE transmits the uplink transmission to the base station.

In an aspect, the apparatus may be a UE. The UE includes means for receiving a DCI from a base station. The UE includes means for determining whether a beam change instruction is detected in the DCI. The UE includes means for indicating via an uplink transmission which is associated with the DCI whether the beam change instruction is detected, the uplink transmission including at least one of a PUCCH or a PUSCH. The UE includes means for transmitting the uplink transmission to the base station.

In an aspect, the apparatus may be a UE including a memory and at least one processor coupled to the memory. The at least one processor is configured to: receive a DCI from a base station, determine whether a beam change instruction is detected in the DCI, indicate via an uplink transmission which is associated with the DCI whether the beam change instruction is detected, the uplink transmission including at least one of a PUCCH or a PUSCH, and transmit the uplink transmission to the base station.

In an aspect, a computer-readable medium storing computer executable code for a UE includes code to: receive a DCI from a base station, determine whether a beam change instruction is detected in the DCI, indicate via an uplink transmission which is associated with the DCI whether the beam change instruction is detected, the uplink transmission including at least one of a PUCCH or a PUSCH, and transmit the uplink transmission to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1 is a diagram illustrating an example of a wireless communications system and an access network.

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 3:
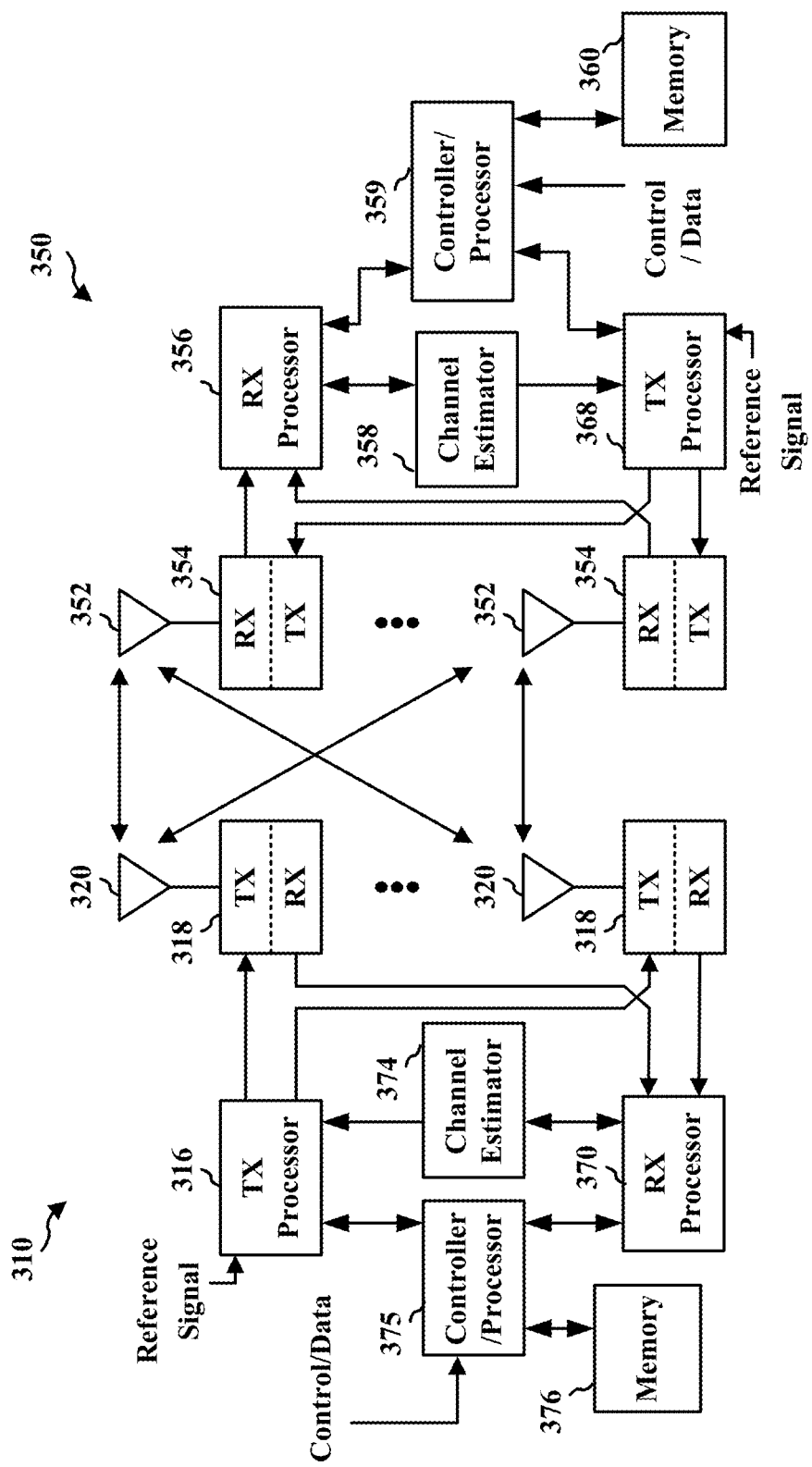
FIG. 3 is a diagram illustrating an example of an evolved Node B (eNB) and user equipment (UE) in an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to enable the eNB 102 to more reliably determine whether the UE 104 has detected a beam change instruction from the eNB 102 (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wireless communication systems employing narrow bandwidths and high frequency carriers are being developed and deployed. An mmW system may be utilized for wireless communication at a high transmission rate. In mmW systems, because the carrier frequency is high (e.g., 28 GHz), path loss may be high. For example, the carrier frequency for mmW communication may be 10 times higher than a carrier frequency for other types of wireless communication. As a result, the mmW system may experience a path loss that is approximately 20 dB higher than other types of wireless communication systems employing lower frequency carriers. To mitigate the path loss in mmW systems, a base station may perform transmissions in a directional manner, where the transmissions are beam-formed to steer the transmissions of the beams in different directions.

Using a higher carrier frequency for wireless communication results in a shorter wavelength which may allow a higher number of antennas to be implemented within a given antenna array length than can be implemented when a lower carrier frequency is used. Therefore, the mmW system (using a high carrier frequency) may use a higher number of antennas in a base station and/or a UE. For example, the BS may have 128 or 256 antennas and the UE may have 8, 16 or 24 antennas. With the higher number of antennas, a beam-forming technique may be used to digitally change the direction of the beam by applying different phases to the different antennas. Because beam-forming in a mmW system provides a narrower beam for increased gain, the base station may transmit the narrower beam in multiple directions when transmitting a synchronization signal to provide coverage over a wider area using multiple narrower beams.

One challenge in using beam-forming for a mmW system arises from the directional nature of a beam-formed beam. Due to the directional nature of the beam-formed beam, the base station should point the beam directly at the UE such that the direction of the beam aligns with the location of the UE to provide more antenna receive gain at the UE. If the direction of the beam is not properly aligned, the antenna gain at the UE may be decreased (e.g., resulting in low SNR, higher block error rates, etc.). Further, when the UE enters the coverage area of the mmW system and receives transmitted data from the base station over the mmW, the base station should be able to determine the best beam(s) (e.g., beam(s) with the highest signal strength, highest SNR, lowest error rate, etc.) for mmW communication with the particular UE. Thus, the base station may transmit beam reference signals (BRSs) in multiple directions (or all directions) so that the UE may identify the best beam of the one or more beams received from the base station based on measurements of the BRSs. In the mmW communication, the base station may also transmit a primary synchronization signal (PSS), a secondary synchronization signal (SSS), an extended synchronization signal (ESS), and PBCH signals for synchronization and for broadcasting system information. In the mmW communication, such signals may be transmitted directionally via multiple beams to enable the UE to receive such synchronization and system information at various locations within the coverage area of the base station.

If there are multiple antenna ports (multiple sets of antennas) in the base station, the base station may transmit multiple beams per symbol. For example, the base station may sweep in one set of multiple directions using multiple antenna ports in a cell specific manner in a first symbol of a synchronization sub-frame. The base station may then sweep in another set of multiple directions using the multiple antenna ports in a cell specific manner in another symbol of the synchronization sub-frame. Each antenna port may include a set of antennas. For example, an antenna port including a set of antennas (e.g., 64 antennas) may transmit one beam, and several antenna ports may each transmit a beam, each beam in a different direction. Thus, if there are four antenna ports, the four antenna ports may sweep through four directions (e.g., transmit four beams in four different directions).

Figure 4A:
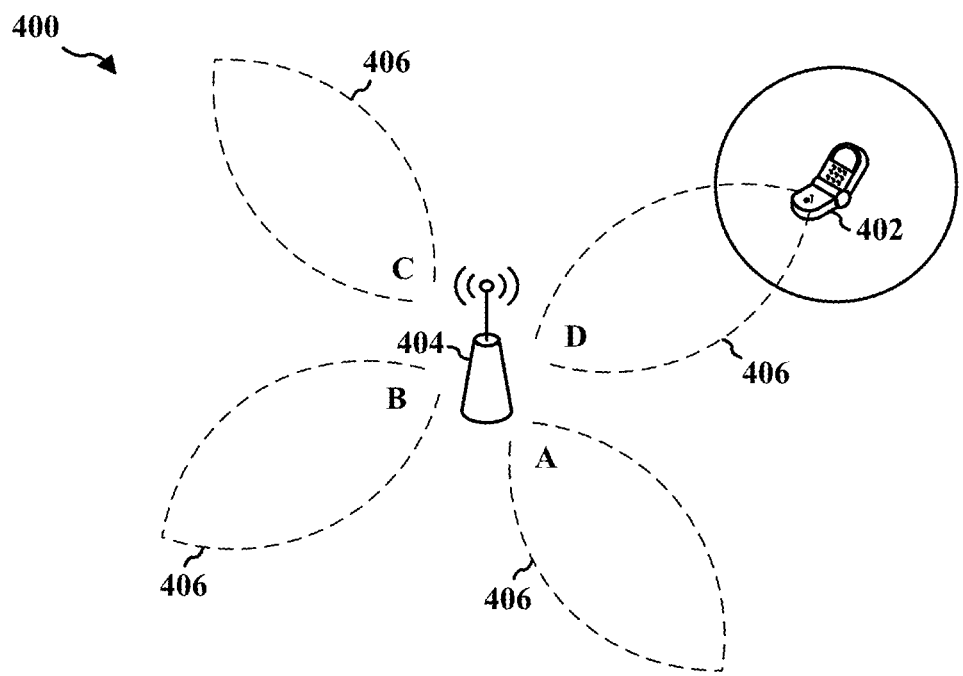
FIGS. 4A and 4B are diagrams illustrating an example of the transmission of beamformed signals between a base station and a UE.
Figure 4B:
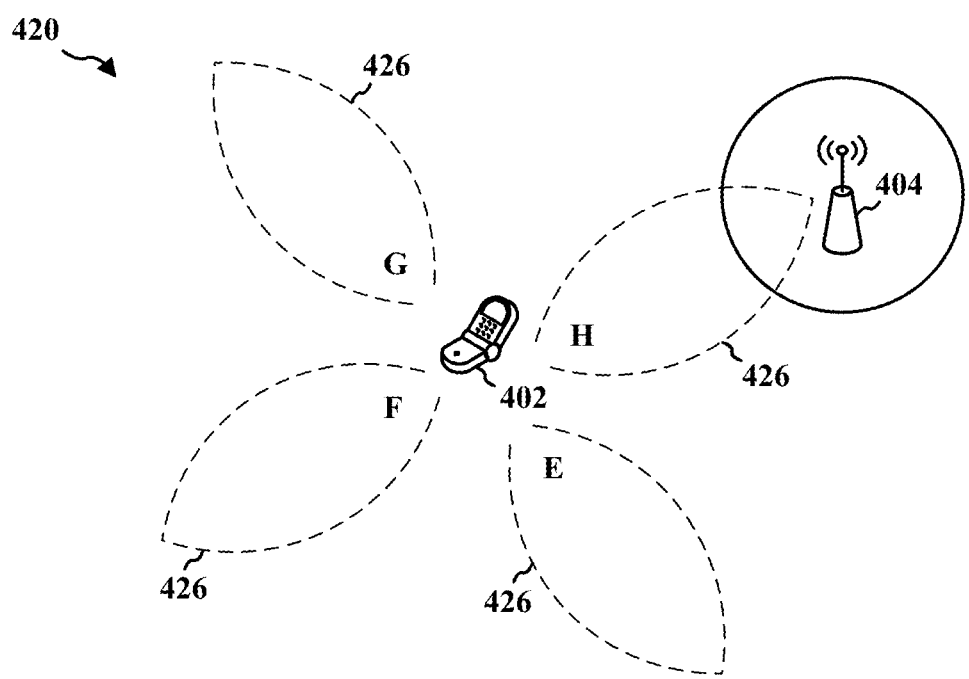

FIGS. 4A and 4B are diagrams illustrating an example of the transmission of beamformed signals between a base station (BS) and a UE. The BS may be embodied as a BS in a mmW system (mmW BS). Referring to FIG. 4A, diagram 400 illustrates a BS 404 of a mmW system transmitting beamformed signals 406 (e.g., beam reference signals) in different transmit directions (e.g., directions A, B, C, and D). In an example, the BS 404 may sweep through the transmit directions according to a sequence A-B-C-D. In another example, the BS 404 may sweep through the transmit directions according to the sequence B-D-A-C. Although four transmit directions and two transmit sequences are described with respect to FIG. 4A, any number of different transmit directions and transmit sequences are contemplated.

After transmitting the signals, the BS 404 may switch to a receive mode. In the receive mode, the BS 404 may sweep through different receive directions in a sequence or pattern corresponding (or mapping) to a sequence or pattern in which the BS 404 previously transmitted the synchronization/discovery signals in the different transmit directions. For example, if the BS 404 previously transmitted the synchronization/discovery signals in transmit directions according to the sequence A-B-C-D, then the BS 404 may sweep through receive directions according to the sequence A-B-C-D in an attempt to receive an association signal from a UE 402. In another example, if the BS 404 previously transmitted the synchronization/discovery signals in transmit directions according to the sequence B-D-A-C, then the BS 404 may sweep through receive directions according to the sequence B-D-A-C in an attempt to receive the association signal from the UE 402.

A propagation delay on each beamformed signal allows a UE 402 to perform a receive (RX) sweep. The UE 402 in a receive mode may sweep through different receive directions in an attempt to detect a synchronization/discovery signal via the beam formed signal 406 (see FIG. 4B). One or more of the synchronization/discovery signals 406 may be detected by the UE 402. When a strong synchronization/discovery signal 406 is detected, the UE 402 may determine an optimal transmit direction of the BS 404 and an optimal receive direction of the UE 402 corresponding to the strong synchronization/discovery signal. For example, the UE 402 may determine preliminary antenna weights/directions of the strong synchronization/discovery signal 406, and may further determine a time and/or resource where the BS 404 is expected to optimally receive a beamformed signal (e.g., with high signal strength). Thereafter, the UE 402 may attempt to associate with the BS 404 via a beamformed signal.

The BS 404 may sweep through a plurality of directions using a plurality of ports in a cell-specific manner in a first symbol of a synchronization subframe. For example, the BS 404 may sweep through different transmit directions (e.g., directions A, B, C, and D) using four ports in a cell-specific manner in a first symbol of a synchronization subframe. In an aspect, the different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the BS 404 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 420 of FIG. 4B, the UE 402 may listen for beamformed discovery signals in different receive directions (e.g., directions E, F, G, and H). In an example, the UE 402 may sweep through the receive directions according to a sequence E-F-G-H. In another example, the UE 402 may sweep through the receive directions according to the sequence F-H-E-J. Although four receive directions and two receive sequences are described with respect to FIG. 4B, any number of different receive directions and receive sequences are contemplated.

The UE 402 may attempt the association with the BS 404 by transmitting beamformed signals 426 (e.g., association signals or another indication of a best "coarse" beam or a best "fine" beam) in the different transmit directions (e.g., directions E, F, G, and H). In an aspect, the UE 402 may transmit an association signal 426 by transmitting along the optimal receive direction of the UE 402 at the time/resource where the BS 404 is expected to optimally receive the association signal. The BS 404 in the receive mode may sweep through different receive directions and detect the association signal 426 from the UE 402 during one or more timeslots corresponding to a receive direction. When a strong association signal 426 is detected, the BS 404 may determine an optimal transmit direction of the UE 402 and an optimal receive direction of the BS 404 corresponding to the strong association signal. For example, the BS 404 may determine preliminary antenna weights/directions of the strong association signal 426, and may further determine a time and/or resource where the UE 402 is expected to optimally receive a beamformed signal. Any of the processes discussed above with respect to FIGS. 4A and 4B may be refined or repeated over time such that the UE 402 and BS 404 eventually learn the most optimal transmit and receive directions for establishing a link with each other. Such refinement and repetition may be referred to as beam training.

In an aspect, the BS 404 may choose a sequence or pattern for transmitting the synchronization/discovery signals according to a number of beamforming directions. The BS 404 may then transmit the signals for an amount of time long enough for the UE 402 to sweep through a number of beamforming directions in an attempt to detect a synchronization/discovery signal. For example, a BS beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 402 detects a synchronization/discovery signal from the BS 404, the UE 402 may discover that the strongest synchronization/discovery signal is received when the UE 402 beamforming direction is k=2 and the BS 404 beamforming direction is n=3. Accordingly, the UE 402 may use the same antenna weights/directions for responding (transmitting a beamformed signal) to the BS 404 in a corresponding response timeslot. That is, the UE 402 may send a signal to the BS 404 using UE 402 beamforming direction k=2 during a timeslot when the BS 404 is expected to perform a receive sweep at BS 404 beamforming direction n=3.

Path loss may be relatively high in mmW systems. Transmission may be directional to mitigate path loss. A base station may transmit one or more beam reference signals by sweeping in multiple directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may perform beam training for one or more new "fine" beams for the UE.

In various aspects, a base station may transmit a beam reference signal (BRS) by sweeping in all directions that so a user equipment (UE) may determine the index or identifier (ID) of a best "coarse" beam. The base station may further transmit a beam refinement request signal so that the UE may track "fine" beams. The UE may signal a best "fine" beam to the base station. The base station and the UE may have to continuously update and/or recover beams to sustain a communication link.

In FIG. 4A and FIG. 4B, the base station 404 and the UE 402 may sweep through four directions using four ports in a cell-specific manner in the first symbol of the synchronization subframe. The four directions may be considered "coarse" beam directions. In an aspect, a BRS may be included in a first symbol. In an aspect, the base station 404 and the UE 402 may sweep through four different directions in a cell-specific manner using four ports in the second symbol of the synchronization subframe. Note that while beams are shown adjacent, beams transmitted during a same symbol may not be adjacent.

FIGS. 5A through 5G are diagrams illustrating an example of the transmission of beamformed signals between a base station (BS) and a UE. The BS 504 may be a BS in a mmW system (mmW BS). While some beams are illustrates as adjacent to one another, such an arrangement may be different in different aspects (e.g., beams transmitted during a same symbol may not be adjacent to one another).

Figure 5B:
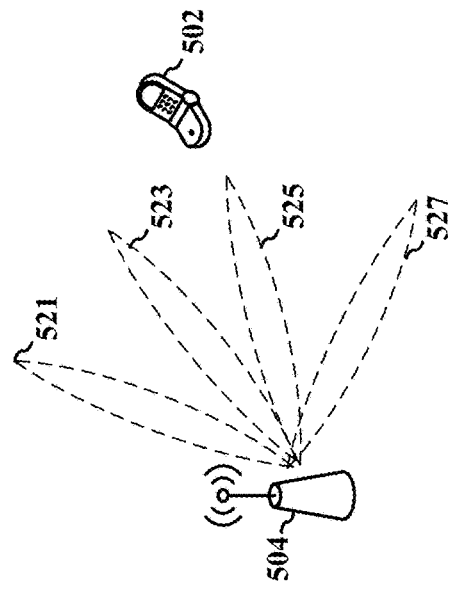
FIG. 5A through 5D illustrate diagrams of a wireless communications system.

In an aspect, a beam set may contain eight different beams. For example, FIG. 5A illustrates eight beams 521, 522, 523, 524, 525, 526, 527, 528 for eight directions. In aspects, the BS 504 may be configured to beamform at least one of the beams 521, 522, 523, 524, 525, 526, 527, 528 for transmission toward the UE 502.

In an aspect, a BS may transmit a first tracking signal (e.g., a BRS) in a plurality of directions during a synchronization subframe. In one aspect, the transmission may be cell-specific. Referring to FIG. 5B, the BS 504 may transmit beams 521, 523, 525, 527 in four directions. In an aspect, the beams 521, 523, 525, 527 transmitted in the four directions may be odd-indexed beams 521, 523, 525, 527 for the four directions out of a possible eight for the beam set. For example, the BS 504 may be capable of transmitting beams 521, 523, 525, 527 in directions adjacent to other beams 522, 524, 526, 528 that the BS 504 is configured to transmit. In an aspect, the configuration in which the BS 504 transmits odd-indexed beams 521, 523, 525, 527 for the four directions may be considered a "coarse" beam set.

Figure 5D:
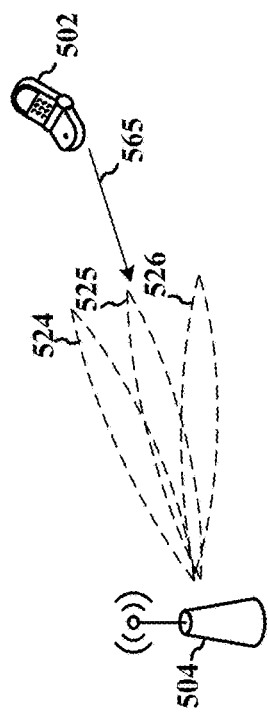
Figure 5A:
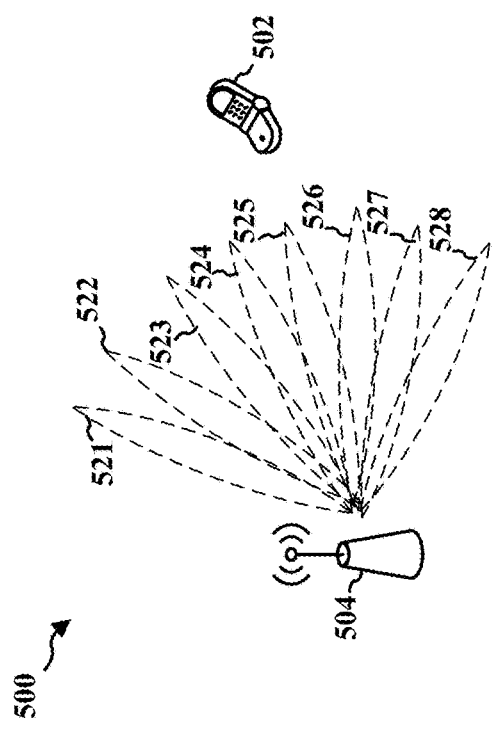
Figure 5C:
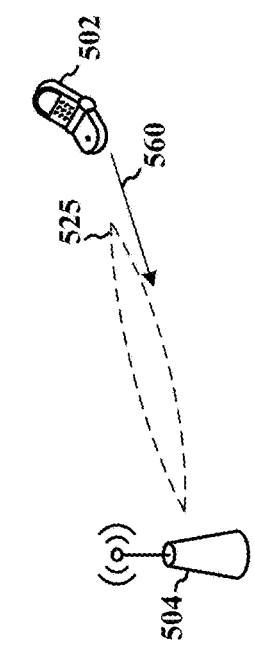

In FIG. 5C, the UE 502 may determine a beam index that is strongest or preferable. For example, the UE 502 may determine that the beam 525 carrying a BRS is strongest or optimal (e.g., with a highest signal strength). The UE 502 may transmit an indication 560 of the beam index of beam 525 to the BS 504. In an aspect, the indication 560 may include a request to transmit a second tracking signal (e.g., a beam refinement reference signal (BRRS)). The BRRS may be UE-specific.

In FIG. 5D, the BS 504 may transmit a second tracking signal (e.g., a BRRS) based on the index included in the indication 560. For example, the UE 502 may indicate that a first beam 525 is strongest or optimal and, in response, the BS 504 may transmit a plurality of beams 524, 525, 526 to the UE 502 based on the indicated beam index. In an aspect, the beams 524, 525, 526 transmitted based on the indicated beam index may be considered a "fine" beam set. In an aspect, a BRRS may be transmitted in each of the beams 524, 525, 526 of the fine beam set. In an aspect, the beams 524, 525, 526 of the fine beam set may be adjacent.

Based on one or more BRRSs received in the beams 524, 525, 526 of the fine beam set, the UE 502 may transmit a second indication 565 to the BS 504 to indicate a best "fine" beam (e.g., the beam that provides the highest SNR, lowest error rate, etc.). In an aspect, the second indication 565 may use 2 bits to indicate the selected beam. For example, the UE 502 may transmit an indication 565 that indicates the selected beam 525. The BS 504 may then communicate with the UE 502 using the selected beam 525.

After selection of a transmit beam to transmit from a base station, the best transmit beam from a base station to a UE may change over time. The best transmit beam may be a beam that provides the highest signal strength, the highest SNR, and/or the lowest error rate. The base station may transmit a BRS in multiple directions (or all directions) periodically. Based on the reception of the BRS, if the UE determines that another transmit beam in a certain direction used to transmit the BRS is better than the current transmit beam, then the UE may determine to change the transmit beam of the base station from the current beam to another transmit beam. To change to another transmit beam, the UE may utilize the beam selection process, as discussed above, involving beam refinement based on a "coarse" beam set.

When the UE determines to change a beam of the base station from a current beam to a second beam, the UE informs the base station about the determination to change to the second beam. The current beam and the second beam may be transmit beams of the base station or receive beams of the base station. In response, the base station sends a beam change instruction to the UE (e.g., via a PDCCH) to indicate whether the base station will change the current beam to the second beam. In an aspect, when the UE informs the base station about the change, the base station may determine not to change the current beam to the second beam if the change from the current beam to the second beam is not appropriate (e.g., if the second beam interferes with a neighboring base station). When the base station determines that the change from the current beam to the second beam is appropriate (e.g., does not interfere with a neighboring base station), the base station sends a beam change instruction to the UE (e.g., via a PDCCH) to indicate that the base station will change the beam. In an aspect, a portion (e.g., a certain number of bits) of DCI included in the PDCCH is used to convey the beam change instruction to indicate whether the base station will change from the current beam to the second beam. If the UE receives the beam change instruction indicating that the base station will change from the current beam to the second beam, the UE may change the beam of the UE to a corresponding receive beam that corresponds to the second beam.

The base station should confirm that the UE has received the beam change instruction. If the base station cannot determine that the UE has received the beam change instruction, the base station may not change the current beam of the base station. At least one of several approaches may be utilized for the base station to determine whether or not the UE received the beam change instruction. For example, the base station may send the beam change instruction in a DCI for a downlink grant or a DCI for an uplink grant, and the UE may respond by transmitting an ACK (to indicate that the UE received the beam change instruction) or a NACK (to indicate that the UE did not receive the beam change instruction). When the base station receives an ACK, the base station may confirm that the UE received the beam change instruction. Bits may be reserved in the PDCCH for a DCI for a downlink grant and/or a DCI for an uplink grant. A downlink transmission and/or an uplink transmission may take place at the (n+k)th subframe and a beam change may occur at the (n+k')th subframe, where k'>k. That is, the UE may receive the beam change instruction included in at least one of a DCI for a downlink grant or a DCI for an uplink grant at the n-th subframe, and then transmit an ACK if the UE received the beam change instruction at the (n+k)th subframe, such that the base station may change the beam at the (n+k')th subframe, where k' is greater than k.

A base station may transmit a DCI to the UE in the PDCCH and may also transmit a PDSCH to the UE within one HARQ process. If the base station transmits the DCI to indicate to the UE that the base station may change a transmit beam of the base station for the UE, the base station should be informed whether the UE has successfully decoded the DCI to detect the beam change instruction, regardless of whether a CRC for a corresponding PDSCH passes or fails. In an aspect, if the UE is able to decode the DCI from the PDCCH and to detect the beam change instruction in the DCI, the UE should indicate to the base station that the beam change instruction is successfully detected. When the base station receives the indication that the beam change instruction is successfully detected at the UE, the base station may change the beam of the base station to another beam. As discussed above, the base station may change the beam at the (n+k')th subframe, whereas the DCI is received in the n-th subframe and the corresponding PDSCH is received in (n+k)th subframe, where k' is greater than k.

If the DCI is for an uplink grant, the base station may detect a PUSCH to determine whether the UE has decoded the DCI or not. If the UE does not decode the DCI for the uplink grant, the UE does not transmit a PUSCH. Thus, if the base station does not detect a PUSCH from the UE, the base station may determine that the UE has not decoded the DCI for the uplink grant. Bits/portions in the DCI are generally reserved to convey a beam change instruction. Hence, UE's transmission of the PUSCH indicates that the UE has detected the beam change instruction by the successfully decoding the DCI. The base station can utilize at least one of several ways to determine whether the UE has tried to transmit a PUSCH. For example, the base station may measure the energy of the DMRS of the PUSCH and/or may try to decode the DMRS indicating that the beam change request is successfully detected. For example, if the energy of the DMRS is greater than an energy threshold, the base station may determine that the UE has successfully decoded the DCI for an uplink grant to detect the beam change instruction. On the other hand, if the energy of the DMRS is less than or equal to the energy threshold, the base station may determine that the UE has not successfully decoded the DCI. In another example, if the base station can decode a DMRS, the base station may determine that the UE has successfully decoded the DCI for an uplink grant to detect the beam change instruction. On the other hand, if the base station cannot decode DMRS, the base station may determine that the UE has not successfully decoded the DCI. In another example, the base station may use the energy of the traffic of a PUSCH to determine if the UE has successfully decoded the DCI for an uplink grant to detect the beam change instruction. If the energy of the received samples of the uplink traffic (e.g., PUSCH traffic) is greater than an energy threshold, the base station may determine that the UE has successfully decoded the DCI for an uplink grant to detect the beam change instruction. On the other hand, if the energy of the received samples of the uplink traffic (e.g., PUSCH traffic) is less than or equal to the energy threshold, the base station may determine that the UE has not successfully decoded the DCI.

In a case with the DCI for a downlink grant, because a PUCCH may contain an ACK/NACK response for another HARQ process unrelated to the beam change request, the UE may not correctly indicate whether the beam change request is successfully detected when transmitting the ACK/NACK response in the PUCCH. A NACK may be a default response when the DCI is not decoded. When a base station transmits a DCI for a downlink grant via a PDCCH, the UE attempts to decode the PDCCH to recover the DCI that includes a beam change instruction. The UE may determine based on the DCI that when the UE receives a PDSCH at (n+k)th subframe, the beam change may occur at (n+k')th subframe, where k' is greater than k. If the UE receives the PDSCH at the (n+k)th subframe but cannot decode the PDSCH, then a cyclic redundancy check (CRC) for the PDSCH fails. In such a scenario, because the UE cannot decode the PDSCH, the UE sends a NACK on the PUCCH to the base station. Thus, even in a case where the UE has successfully decoded PDCCH, the UE may still send a NACK on the PUCCH to the base station if the UE cannot decode the PDSCH. In such a situation, due to the UE sending a NACK to the base station, the base station may mistakenly determine that the UE has not successfully decoded the DCI even when the UE successfully decoded the DCI to obtain the beam change instruction. In another example, the UE may send a combined ACK/NACK response for multiple HARQ processes. The UE may decode a PDCCH, which conveys a beam change instruction in the DCI, and may also decode a PDSCH corresponding with the PDCCH successfully. However, the UE may not decode a PDCCH or a PDSCH of another HARQ process successfully. If the UE sends a combined ACK/NACK response for the two different PDSCH transmissions, the UE sends a NACK to the base station even if the UE successfully decoded the beam change instruction of the PDCCH. The base station may mistakenly determine that the UE has not successfully decoded the DCI even though the UE successfully decoded the DCI to obtain the beam change instruction. In summary, if the UE decodes the DCI to successfully detect the beam change instruction but the CRC for the PDSCH fails, the UE may transmit a NACK on the PUCCH due to the CRC failure. In this case, the UE is informed based on the beam change instruction that a beam change should occur, but the base station may determine incorrectly that the UE has not detected the beam change instruction from the DCI based on the NACK. Therefore, an approach to address the above-identified issues is desired.

Figure 6A:
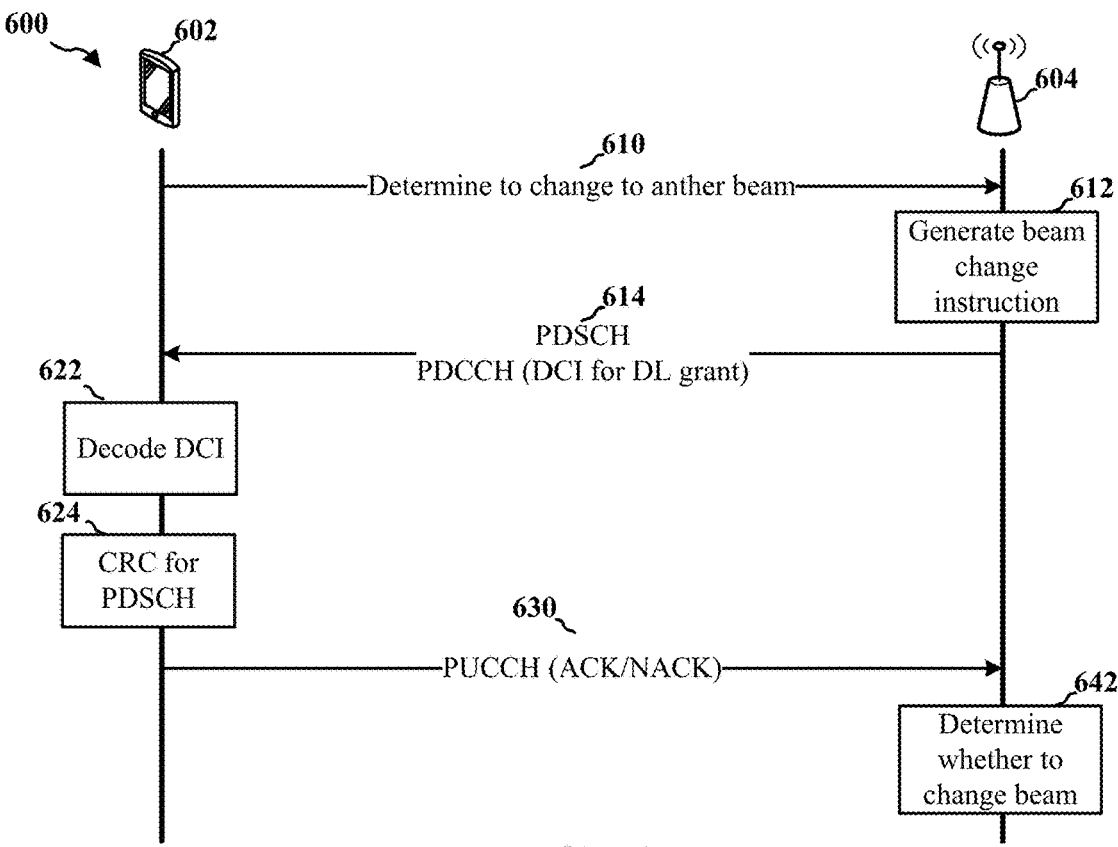
FIGS. 6A and 6B are example diagrams illustrating communication between a user equipment and a base station for a beam change.
Figure 6B:
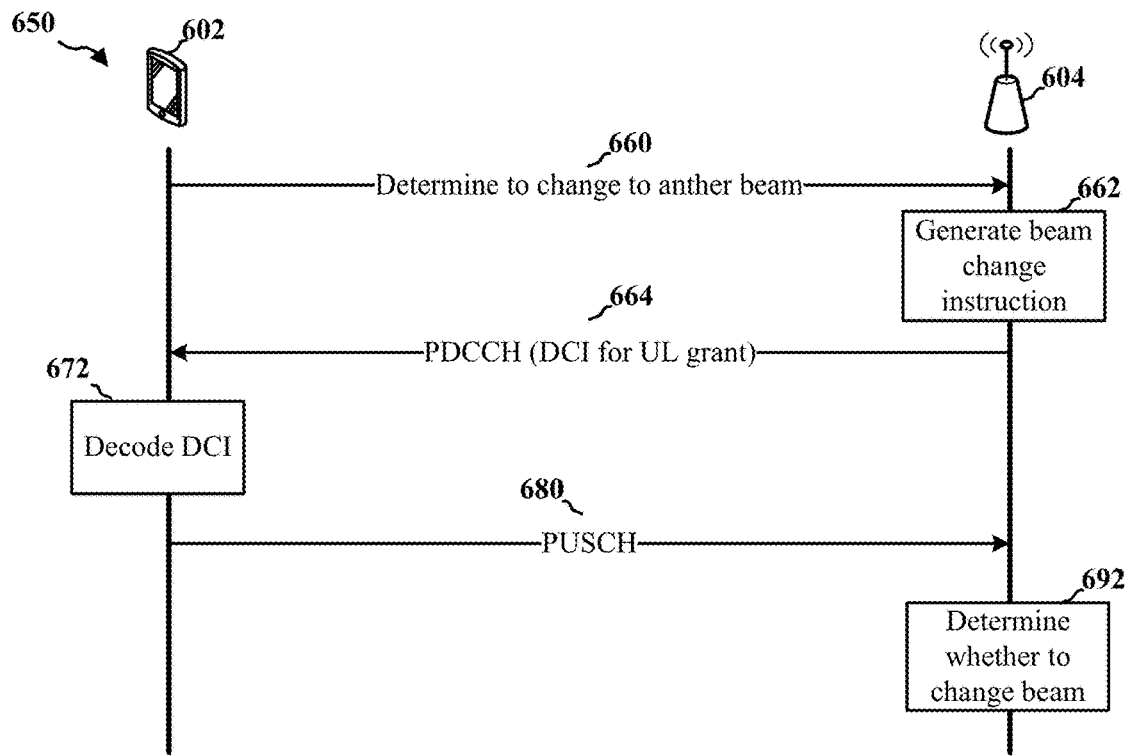

FIGS. 6A and 6B are example diagrams illustrating communication between a user equipment and a base station for a beam change. FIG. 6A is an example diagram 600 illustrating communication between a UE and a base station for a beam change when a DCI for a downlink grant is used. The example diagram 600 involves communication between a UE 602 and a base station 604. At 610, the UE 602 indicates to the base station 604 that the UE 602 has determined to change the current beam of the base station 604 to another beam (e.g., upon determining that there is a better beam that provides a higher SNR than the current beam). At 612, the base station 604 generates a beam change instruction to indicate whether the base station 604 will perform beam change from the current beam to another beam, and includes the beam change instruction in a DCI for a downlink grant. At 614, the base station transmits a PDDCH including the DCI and also transmits a PDSCH. At 622, the UE successfully decodes the DCI to detect the beam change instruction. At 624, the UE performs a CRC for the PDSCH. At 630, the UE transmits an ACK/NACK response based on whether nor not the UE successfully decoded the DCI to detect the beam change instruction via a PUCCH. At 642, based on the ACK/NACK, the base station 604 determines whether to change the current beam to another beam. As discussed above, in a case where the DCI is for a DL grant, even if the UE 602 successfully decodes the DCI (e.g., at 622) to detect the beam change instruction, the UE 602 may still send a NACK via the PUCCH if the CRC for the PDSCH fails (e.g., at 624).

FIG. 6B is an example diagram 650 illustrating communication between a UE and a base station for a beam change when a DCI for an uplink grant is used. The example diagram 650 involves communication between a UE 602 and a base station 604. At 660, the UE 602 indicates to the base station 604 that the UE 602 has determined to change the current beam of the base station 604 to another beam (e.g., upon determining that there is a better beam than the current beam). At 662, the base station 604 generates a beam change instruction to indicate whether the base station 604 will perform beam change from the current beam to another beam, and includes the beam change instruction in a DCI for an uplink grant. At 664, the base station transmits a PDCCH including the DCI. At 672, the UE successfully decodes the DCI to detect the beam change instruction. At 680, the UE transmits a PUSCH if the UE successfully decoded the DCI to detect the beam change instruction. At 642, based on the PUSCH, the base station 604 determines whether to change the current beam to another beam. The example diagram 650 does not exhibit the same problem as the example diagram 600, where the UE 602 of the example diagram 600 may still send a NACK even if the UE 602 successfully decodes the DCI as long as the CRC for the PDSCH fails.

According to an aspect of the disclosure, when the base station generates a beam change instruction to indicate that the base station will change from the current beam to another beam, the base station transmits the beam change instruction in DCI to the UE. The beam associated with the beam change instruction may be a transmit beam of the base station or a receive beam of the base station. When the UE receives DCI from the base station, the UE decodes the DCI to attempt to detect a beam change instruction in the DCI. Subsequently, the UE may indicate to the base station whether the UE has detected the beam change instruction, such that the base station may determine whether the UE has detected the beam change instruction based on the indication. If the base station determines that the beam change instruction is detected by the UE, the base station may change from the current beam to another beam. Several approaches may be utilized to implement the features according to the aspect of the disclosure, as discussed infra.

Figure 7A:
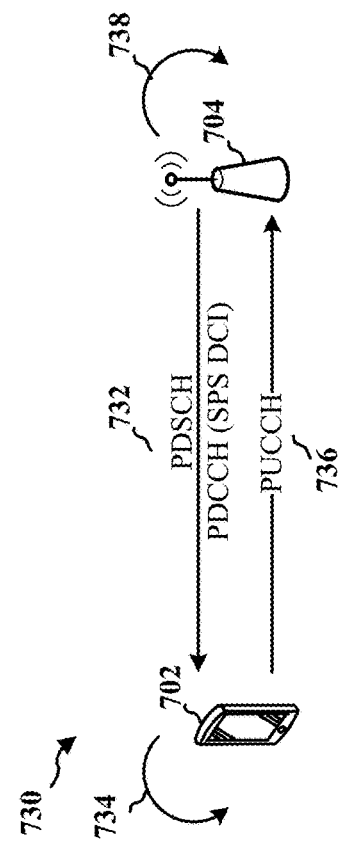
FIGS. 7A-7D are example diagrams illustrating the first, second, third, and fourth aspects of the disclosure.

According to a first aspect of the disclosure, the base station may utilize a DCI for an uplink grant, to communicate a beam change instruction. Thus, for example, the base station may utilize a DCI for an uplink grant when a DCI is used to communicate a beam change instruction to the UE. FIG. 7A is an example diagram 700 illustrating the first aspect of the disclosure. After the base station 704 determines to change the beam, the base station 704 transmits at 712 a PDCCH with a DCI for an uplink grant. The UE 702 attempts to decode the DCI to detect the beam change instruction at 714. The UE 702 transmits at 716 an indication to indicate whether the beam change instruction is detected via a PUSCH. At 718, based on the indication from the UE 702, the base station 704 determines whether to change the beam (e.g., by decoding the indication). In one example, as discussed above, the base station may measure the energy of the DMRS of the PUSCH to determine whether the DCI for uplink is successfully decoded to detect the beam change request. As discussed above, if the energy of the DMRS is greater than an energy threshold, the base station may determine that the UE has successfully decoded the DCI for uplink grant to detect the beam change instruction. In another example, the base station may attempt to decode the DMRS of the PUSCH, where the DMRS indicates that the beam change instruction is detected by the UE. Because the base station relies on at least one of the energy of the DMRS for such determination, decoding of the DMRS, or an energy of the uplink traffic, the ACK/NACK response for the CRC for the PDSCH does not interfere with the base station determining whether the DCI for uplink is successfully decoded to detect the beam change request.

Figure 7B:
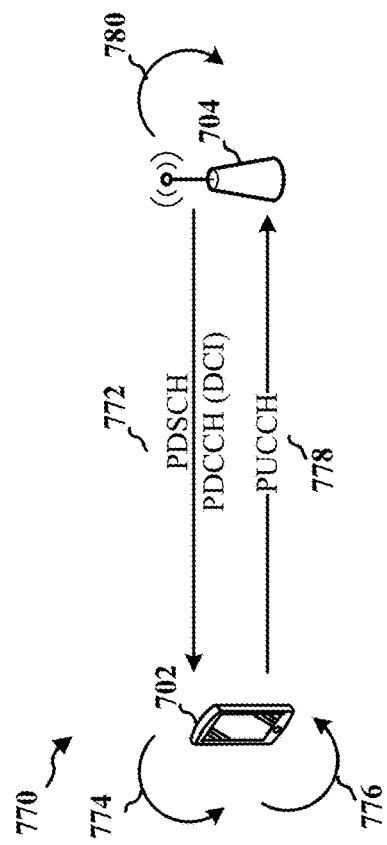

According to a second aspect of the disclosure, the base station may use a semi-persistent scheduling (SPS) type DCI such that an ACK is expected based on successful decoding of the SPS type DCI. In a case where one ACK/NACK response is used for both a PDSCH and the SPS type DCI decoding, if the UE does not successfully receive a PDSCH, the UE may send a NACK to the base station regardless of whether the SPS type DCI is successfully decoded. In the second aspect of the disclosure, a response to the SPS type DCI is not associated with a response to the PDSCH. Thus, in the second aspect, although the UE may transmit an ACK/NACK response in response to the PDSCH, the UE transmits a separate ACK/NACK response for decoding of the SPS type DCI, where the separate ACK/NACK response is different from the ACK/NACK response in response to the PDSCH. For example, the UE transmits an ACK/NACK response in response to the PDSCH, and also transmits a separate ACK/NACK response in response to the SPS type DCI. The SPS type DCI has a different bit pattern than other types of DCI. For example, when the UE decodes the PDDCH and detects a different bit pattern indicating the SPS type DCI, the UE becomes aware that the UE should transmit a separate ACK/NACK response for the PDDCH carrying the SPS type DCI, independent from the PDSCH. FIG. 7B is an example diagram 730 illustrating the second aspect of the disclosure. After the base station 704 determines to change the beam, the base station 704 transmits at 732 a PDCCH with a SPS type DCI, and may transmit a PDSCH. The UE 702 attempts to decode the SPS type DCI to detect the beam change instruction at 734. The UE 702 transmits at 736 an indication (e.g., a separate ACK/NACK) to indicate whether the beam change instruction is detected to the base station 704 via a PUCCH, where the indication is a separate indication for the PDDCH carrying the SPS type DCI. At 738, based on the indication from the UE 702, the base station 704 determines whether to change the beam. Because a distinct SPS type DCI is utilized, for which a separate ACK/NACK response is transmitted, the ACK/NACK response for the CRC for the PDSCH does not interfere with the separate ACK/NACK response for the successful detection of the beam change instruction.

Figure 7C:
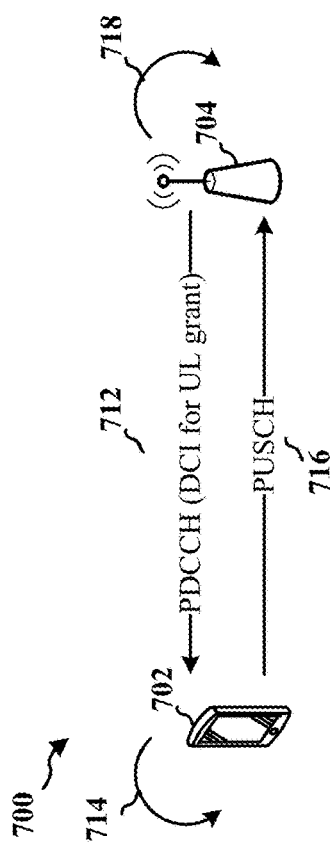

According to a third aspect of the disclosure, when the base station uses a DCI for a downlink grant to convey a beam change instruction, the UE may utilize a distinct scrambling code to scramble the PUCCH transmitted to the base station when the DCI is decoded and the beam switching command is detected from the DCI, where the distinct scrambling code is different from a scrambling code used to scramble the PUCCH when the DCI is not decoded to detect the beam switching command. FIG. 7C is an example diagram 750 illustrating the third aspect of the disclosure. After the base station 704 determines to change the beam, the base station 704 transmits at 752 a PDCCH with a DCI, and may transmit a PDSCH. The UE 702 attempts to decode the DCI to detect the beam change instruction at 754. At 756, if the UE 702 successfully decodes the DCI to detect the beam change instruction, the UE scrambles the PUCCH with a distinct scrambling code to indicate that the beam change instruction is detected. The UE 702 transmits at 758 the scrambled PUCCH. At 760, based on the PUCCH scrambled with the distinct scrambling code received from the UE 702, the base station 704 determines that the beam change instruction is detected and determines to change the beam. Because the distinct scrambling code is used when the beam switching command is detected, the PUCCH scrambled with the distinct scrambling code indicates to the base station that the beam switching command is detected. Thus, the base station may determine that the beam switching command is detected based on receiving the PUCCH scrambled with the distinct scrambling code, even if the UE concurrently sends a NACK for the corresponding PDSCH transmission. Thus, by detecting the PUCCH scrambled with the distinct scrambling code, the base station may determine that the beam switching command is detected.

Figure 7D:
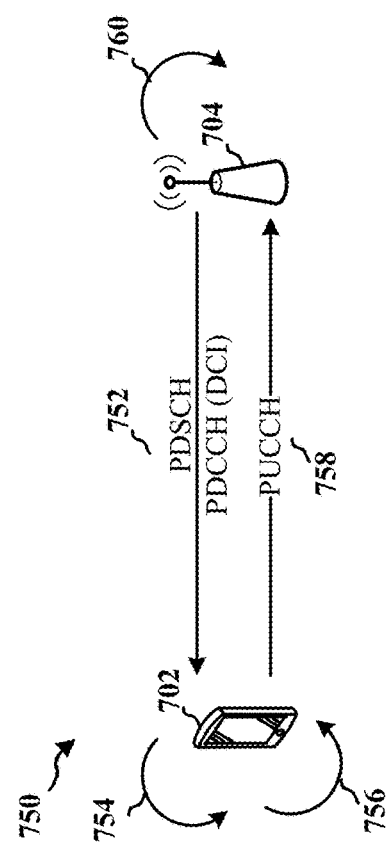

According to a fourth aspect of the disclosure, the UE may include a distinct DMRS sequence in the PUCCH transmitted to the base station when a DCI is decoded and the beam switching command is detected from the DCI. The distinct DMRS sequence is different from a DMRS sequence used by the UE to transmit the PUCCH if the beam change instruction is not detected in the DCI. Thus, by detecting the distinct DMRS sequence in the PUCCH, the base station may determine that the beam switching command is detected. FIG. 7D is an example diagram 750 illustrating the fourth aspect of the disclosure. After the base station 704 determines to change the beam, the base station 704 transmits at 772 a PDCCH with a DCI, and may transmit a PDSCH. The UE 702 attempts to decode the DCI to detect the beam change instruction at 774. At 776, if the UE 702 successfully decodes the DCI to detect the beam change instruction, the UE includes a distinct DMRS sequence in the PUCCH to indicate that the beam change instruction is detected. The UE 702 transmits at 778 the PUCCH with the distinct DMRS sequence. At 780, based on the distinct DMRS sequence in the PUCCH received from the UE 702, the base station 704 determines that the beam change instruction is detected and determines to change the beam. Because the third and fourth aspects provide a specific indication that the beam switching command is detected, the ACK/NACK response for the CRC for the PDSCH does not interfere with this indication.

Figure 8A:
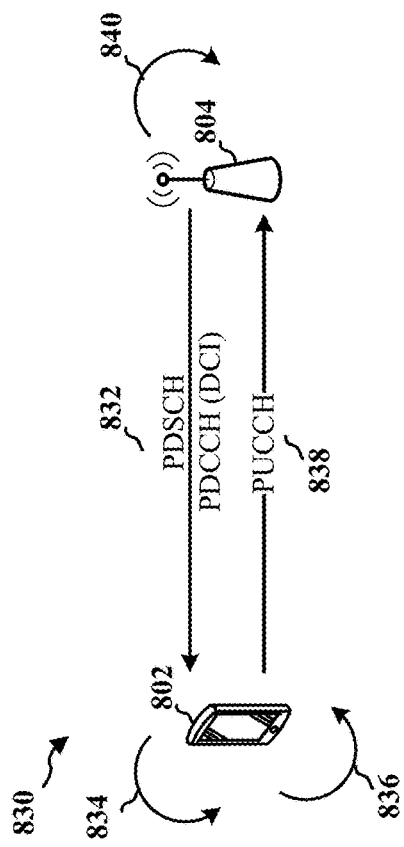
FIGS. 8A-8C are example diagrams illustrating the fifth, sixth, and seventh aspects of the disclosure.

According to a fifth aspect of the disclosure, the UE may send a tri-state indicator (e.g., a tri-state ACK) to provide one of three indications. In an aspect, the tri-state indicator may be sent via a PUCCH (e.g., via bits in the PUCCH for the tri-state indicator). The first indication indicates that the DCI has been successfully decoded and the CRC for a PDSCH has failed. The second indication indicates that the DCI has been successfully decoded and the CRC for the PDSCH has passed. The third indication indicates that the DCI has not been successfully decoded. FIG. 8A is an example diagram 800 illustrating the fifth aspect of the disclosure. After the base station 804 determines to change the beam, the base station 804 transmits at 812 a PDCCH with a DCI, and transmits a PDSCH. At 814, the UE 802 attempts to decode the DCI to detect the beam change instruction, and performs a CRC for the PDSCH. At 816, the UE 802 generates a tri-state indicator including one of the three indications discussed above. The UE 802 transmits at 818 the tri-state indication. At 820, based on the tri-state indication, the base station 804 determines whether to change the beam. For example, the base station 804 may determine to change the beam when the tri-state indication provides the first indication or the second indication because the first indication and the second indication indicate that the DCI has been successfully decoded to detect the beam change instruction. Because the tri-state indicator in the fifth aspect provides a specific indication for CRC pass/fail and successful decoding of the DCI, the ACK/NACK response for the CRC for the PDSCH does not interfere with the tri-state indicator.

Figure 8B:
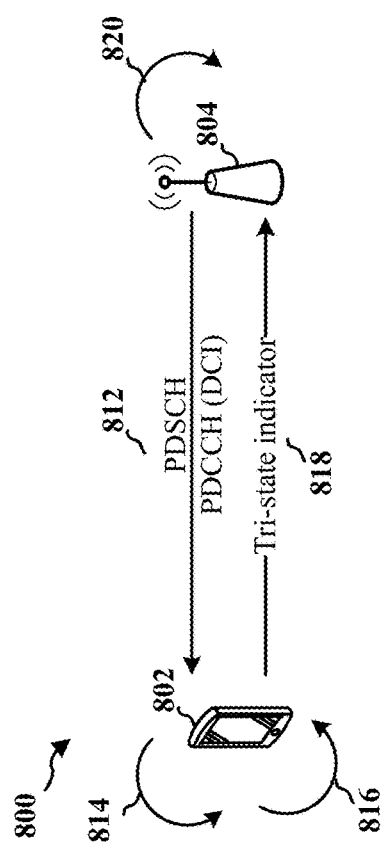
Figure 8C:
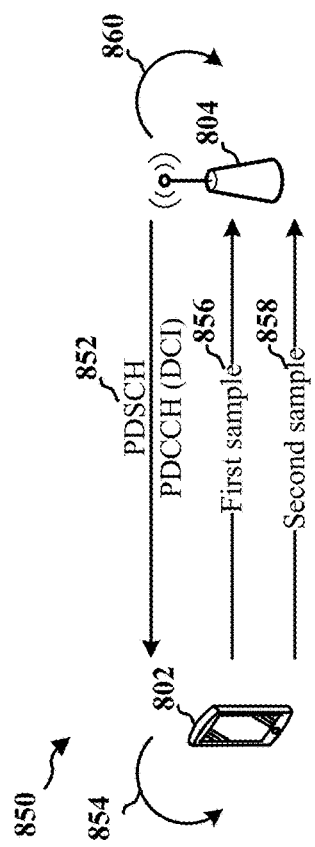

According to a sixth aspect of the disclosure, the UE adds a portion (e.g., a bit) in a PUCCH to separately indicate an ACK/NACK response for successful decoding of the DCI (and detection of the beam change instruction), separate from the ACK/NACK response for the PDSCH. FIG. 8B is an example diagram 830 illustrating the sixth aspect of the disclosure. After the base station 804 determines to change the beam, the base station 804 transmits at 832 a PDCCH with a DCI, and may transmit a PDSCH. At 834, the UE 802 attempts to decode the DCI to detect the beam change instruction. At 836, the UE 802 includes a bit in a PUCCH to separately indicate an ACK/NACK response for successful decoding of the DCI and detection of the beam change instruction. The UE 802 transmits at 838 the PUCCH with the bit. At 840, based on the bit included in the PUCCH, the base station 704 determines whether to change the beam. Because this aspect of the disclosure utilizes a separate portion to indicate an ACK/NACK response for the DCI, the ACK/NACK response for the CRC for the PDSCH does not interfere with the ACK/NACK response for the successful detection of the beam change instruction According to a seventh aspect of the disclosure, after transmitting a DCI including a beam change instruction, the base station receives two or more sample signals using two or more different beams, respectively. The base station may also multiply the same samples of antenna elements with two different beam weights to receive two different samples. At least one of the two or more different beams is indicated by the beam change instruction. The current beam may also be indicated in the beam change instruction. The base station receives the sample signals in a subframe specified in the DCI. Based on the received sample signals, the base determines conditions (e.g., beamwidths) for each of the sample signals, and selects a beam corresponding to a sample signal with the best condition (e.g., narrowest beamwidth). FIG. 8C is an example diagram 850 illustrating the sixth aspect of the disclosure. After the base station 804 determines to change the beam, the base station 804 transmits at 852 a PDCCH with a DCI, and may transmit a PDSCH. At 854, the UE 802 decodes the DCI to detect the beam change instruction. At 856, the base station 804 receives a first sample signal using a current beam. At 858, the base station 804 receives a second sample signal using a second beam indicated by the beam change instruction. At 860, the base station 804 selects one of the current beam and the second beam based on the first sample signal and the second sample signal.

Figure 9:
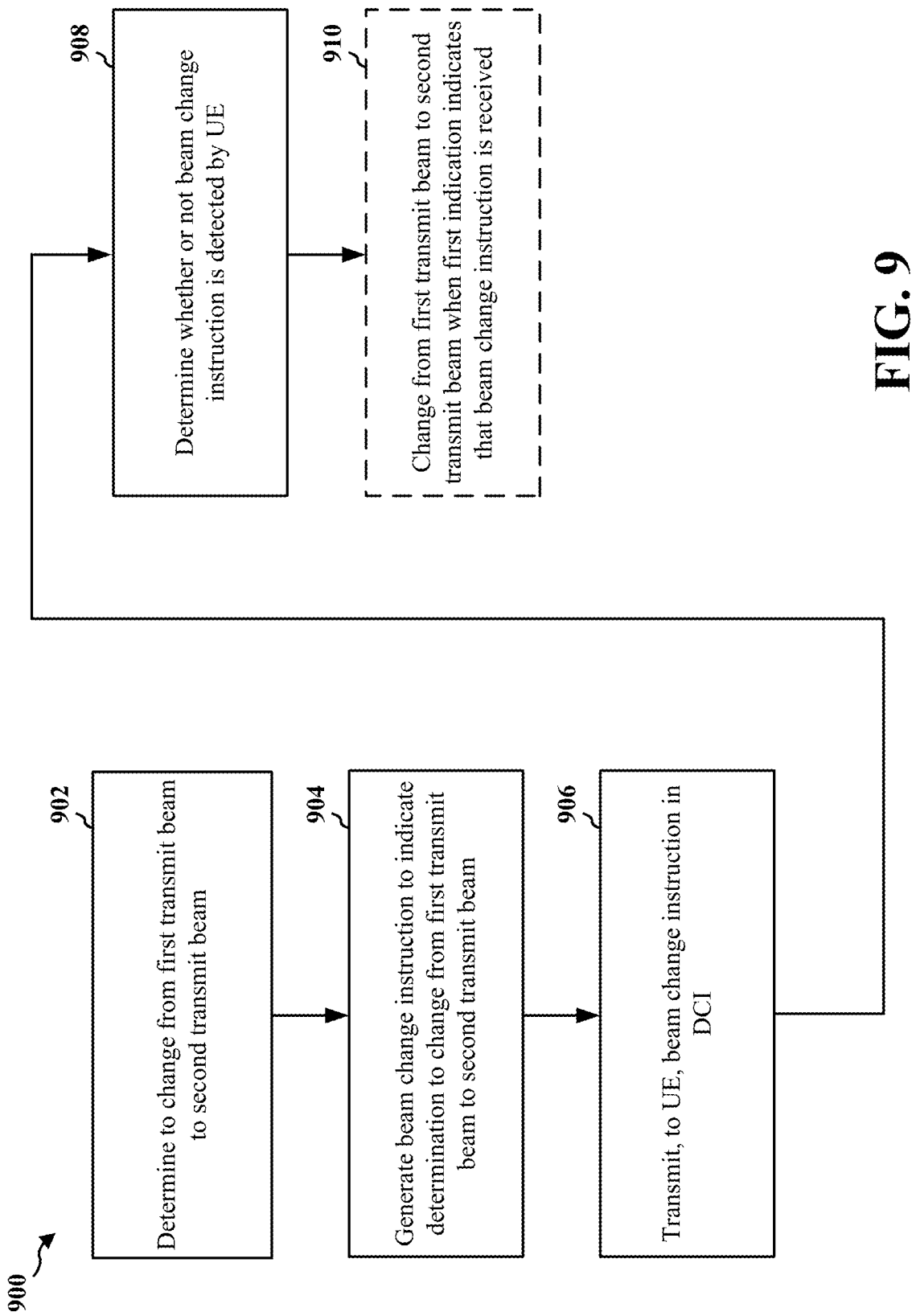
FIG. 9 is a flowchart of a method of wireless communication, according to an aspect of the disclosure.

FIG. 9 is a flowchart 900 of a method of wireless communication, according to an aspect of the disclosure. The method may be performed by a base station (e.g., the base station 704, the base station 804, the apparatus 1202/1202'). At 902, the base station determines to change from a first beam to a second beam. For example, as discussed supra, the base station may determine to change from a current beam to a second beam when the UE indicates to the base station to change the beam of the base station. In an aspect, the first beam and the second beam may be transmit beams or receive beams. At 904, the base station generates a beam change instruction to indicate the determination to change from the first beam to the second beam. At 906, the base station transmits, to a UE, the beam change instruction in a DCI. For example, as discussed supra, when the base station generates a beam change instruction to indicate that the base station will change from the current beam to another beam, the base station transmits the beam change instruction in DCI to the UE. For example, as discussed supra, the beam associated with the beam change instruction may be a transmit beam of the base station or a receive beam of the base station. In an aspect, the base station may transmit the beam change instruction by transmitting a PDCCH including the DCI that is for uplink grant or downlink grant or is communicated via SPS. As illustrated in FIGS. 7A-7D, the base station 704 may transmit DCI for UL grant or DCI for DL grant, or may transmit SPS DCI, via a PDCCH. At 908, the base station determines whether or not the beam change instruction is detected by the UE. For example, as discussed supra, the base station may determine whether the UE has detected the beam change instruction based on the indication from the UE.

In an aspect the DCI is an SPS DCI. In an aspect, the SPS DCI is independent from a PDSCH. In an aspect, the SPS DCI has a different bit pattern than other DCIs. The SPS type DCI has a different bit pattern than other types of DCI. In an aspect, the base station determines whether or not the beam change instruction is detected by receiving from the UE, an ACK indicating that the SPS DCI is received by the UE or a NACK indicating that the SPS DCI is not received by the UE. For example, as discussed supra, when the UE decodes the PDDCH and detects a different bit pattern indicating the SPS type DCI, the UE becomes aware that the UE should transmit a separate ACK/NACK response for the PDDCH carrying the SPS type DCI, independent from the PDSCH. For example, as illustrated in FIG. 7B, the UE 702 transmits at 736 an indication (e.g., a separate ACK/NACK) to indicate whether the beam change instruction is detected to the base station 704 via a PUCCH, where the indication is a separate indication for the PDDCH carrying the SPS type DCI. For example, as illustrated in FIG. 7B, at 738, based on the indication from the UE 702, the base station 704 determines whether to change the beam.

In an aspect, the DCI is for DL grant. In an aspect, base station determines whether or not the beam change instruction is detected by receiving an indication that the beam change instruction is detected, where the determining whether or not the beam change instruction is detected is based on the indication. In such an aspect, the indication is received via a physical uplink control channel (PUCCH), the PUCCH being associated with the DCI for the DL grant. For example, as illustrated in FIGS. 7B-7D and FIG. 8B, the UE 702 may transmit, to the base station 704, a PUCCH with an indication that the beam change instruction is detected. In one aspect, the indication may include the PUCCH scrambled with a beam change scrambling code indicating that the beam change instruction is detected by the UE. In such an aspect, the beam change scrambling code is different from a scrambling code used by the UE to transmit a PUCCH if the beam change instruction is not detected in the DCI. For example, as illustrated in FIG. 7C, at 756, if the UE 702 successfully decodes the DCI to detect the beam change instruction, the UE scrambles the PUCCH with a distinct scrambling code to indicate that the beam change instruction is detected, and the UE 702 transmits at 758 the scrambled PUCCH. For example, as illustrated in FIG. 7C, at 760, based on the PUCCH scrambled with the distinct scrambling code received from the UE 702, the base station 704 determines that the beam change instruction is detected and determines to change the beam.

In another aspect, the indication may include the PUCCH including a beam change DMRS sequence indicating that the beam change instruction is detected by the UE. In such an aspect, the beam change DMRS sequence is different from a DMRS sequence used by the UE to transmit a PUCCH if the beam change instruction is not detected in the DCI. For example, as illustrated in FIG. 7D, at 776, if the UE 702 successfully decodes the DCI to detect the beam change instruction, the UE includes a distinct DMRS sequence in the PUCCH to indicate that the beam change instruction is detected, and the UE 702 transmits at 778 the PUCCH with the distinct DMRS sequence. For example, as illustrated in FIG. 7D, at 780, based on the distinct DMRS sequence in the PUCCH received from the UE 702, the base station 704 determines that the beam change instruction is detected and determines to change the beam.

In another aspect, the indication includes a tri-state indicator indicating one of: successful decoding of the DCI and failure of a CRC for a PDSCH when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded. As illustrated in FIG. 8A, at 816, the UE 802 generates a tri-state indicator including one of the three indications, where the three indications may include the first indication that the DCI has been successfully decoded and the CRC for a PDSCH has failed, the second indication that the DCI has been successfully decoded and the CRC for the PDSCH has passed, and the third indication that the DCI has not been successfully decoded, and the UE 802 transmits at 818 the tri-state indication.

In another aspect, the indication includes a DCI bit included in the PUCCH to indicate whether the DCI is successfully decoded. For example, as illustrated in FIG. 8B, at 836, the UE 802 includes a bit in a PUCCH to separately indicate an ACK/NACK response for successful decoding of the DCI and detection of the beam change instruction, and the UE 802 transmits at 838 the PUCCH with the bit. For example, as illustrated in FIG. 8B, at 840, based on the bit included in the PUCCH, the base station 704 determines whether to change the beam.

In one aspect, the DCI is transmitted for UL grant. In an aspect, the base station determines whether or not the beam change instruction is detected further by receiving an uplink transmission indicating that the UE has detected the beam change instruction, and decoding the uplink transmission to determine whether or not the beam change instruction is detected. For example, as illustrated in FIG. 7A, the UE 702 transmits at 716 an indication to indicate whether the beam change instruction is detected via a PUSCH, and at 718, based on the indication from the UE 702, the base station 704 determines whether to change the beam (e.g., by decoding the indication). In an aspect, the base station determines whether or not the beam change instruction is detected by the UE further by receiving an uplink transmission indicating that the UE has detected the beam change instruction, and detecting an energy of the uplink transmission to determine whether or not the beam change instruction is detected. In such an aspect, the base station determines that the beam change instruction is detected if the detected energy of the uplink transmission is greater than an energy threshold. For example, as discussed supra, as discussed supra, if the energy of the DMRS is greater than an energy threshold, the base station may determine that the UE has successfully decoded the DCI for uplink grant to detect the beam change instruction. In another aspect, the base station determines whether or not the beam change instruction is detected by the UE further by receiving an uplink transmission indicating that the UE has detected the beam change instruction, and decoding a DMRS included in the uplink transmission, the DMRS indicating that the beam change instruction is detected. For example, as discussed supra, the base station may attempt to decode the DMRS of the PUSCH, where the DMRS indicates that the beam change instruction is detected by the UE.

At 910, the base station may change from the first beam to the second beam upon determining that the beam change instruction is detected by the UE. For example, as discussed supra, if the base station determines that the beam change instruction is detected by the UE, the base station may change from the current beam to another beam.

Figure 10:
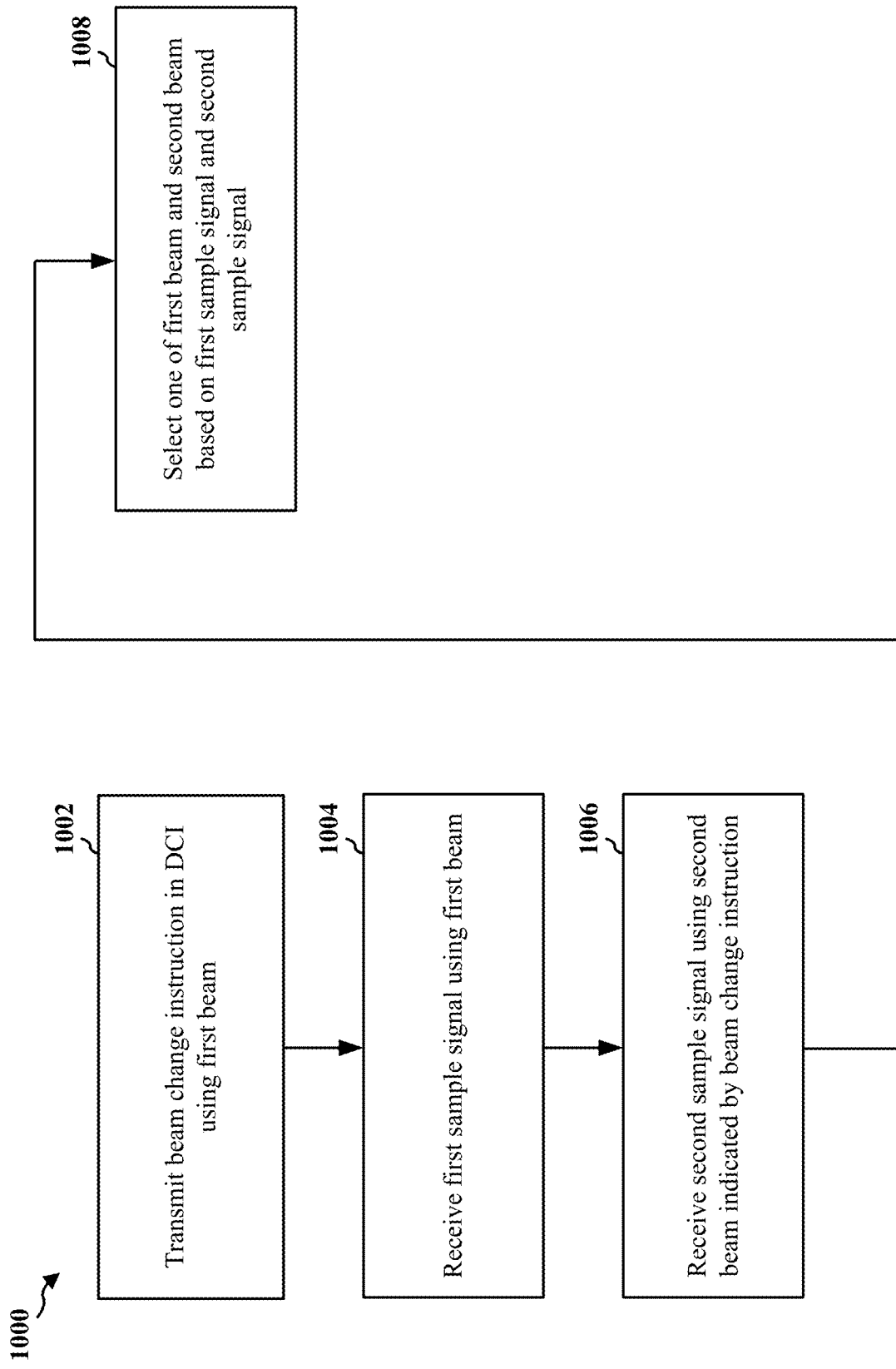
FIG. 10 is a flowchart of a method of wireless communication, according to an aspect of the disclosure.

FIG. 10 is a flowchart 1000 of a method of wireless communication, according to an aspect of the disclosure. The method may be performed by a base station (e.g., the base station 704, the base station 804, the apparatus 1202/1202'). At 1002, the base station transmits a beam change instruction in a DCI using a first beam. At 1004, the base station receives a first sample signal using the first beam. At 1006, the base station receives a second sample signal using a second beam indicated by the beam change instruction. At 1008, the base station selects one of the first beam and the second beam based on the first sample signal and the second sample signal. In an aspect, the first sample signal and the second sample signal are received in a subframe specified to the UE in the DCI. For example, as illustrated in FIG. 8C, at 856, the base station 804 receives a first sample signal using a current beam, and at 858, the base station 804 receives a second sample signal using a second beam indicated by the beam change instruction. For example, as illustrated in FIG. 8C, at 860, the base station 804 selects one of the current beam and the second beam based on the first sample signal and the second sample signal.

Figure 11:
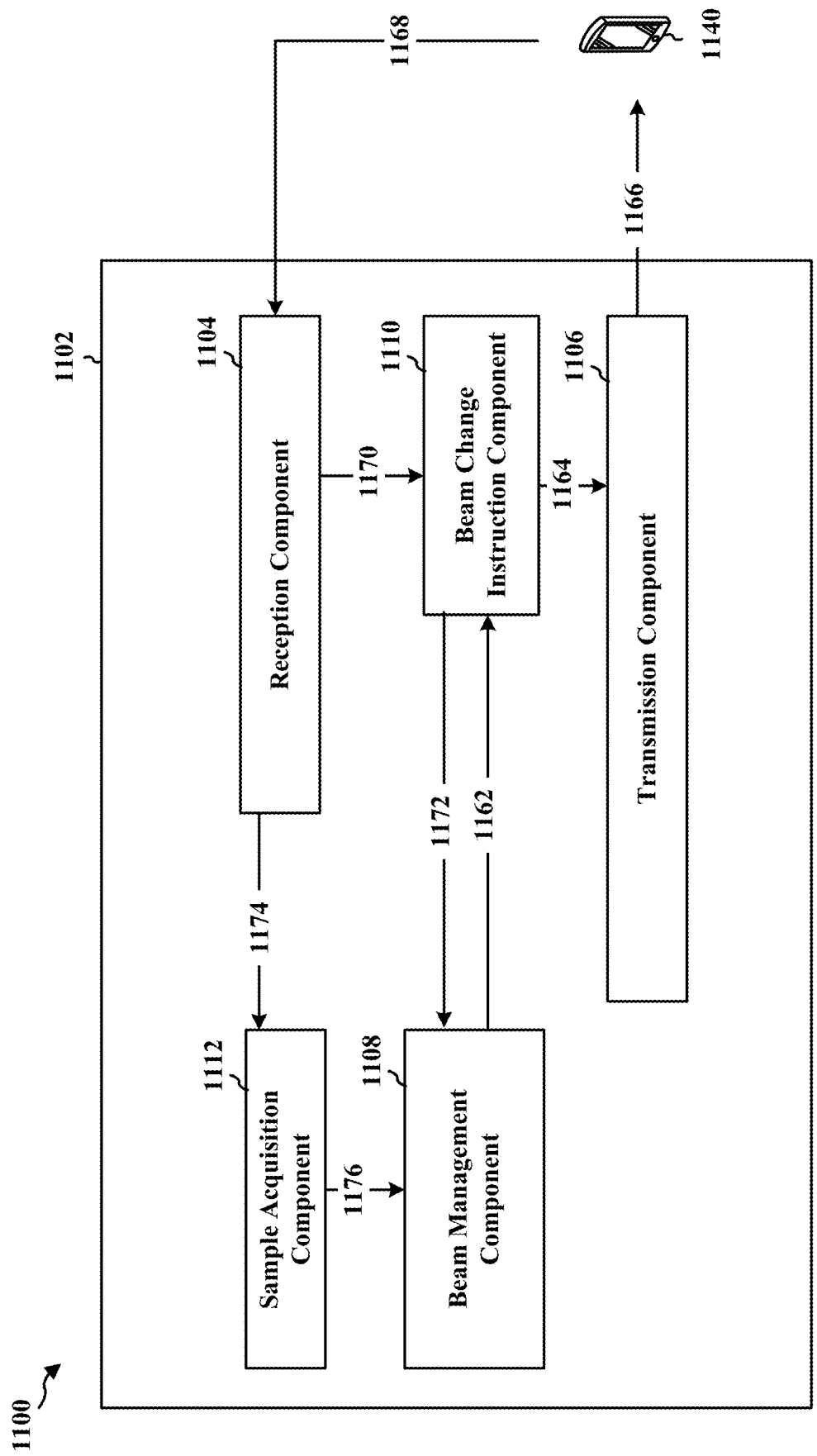
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station. The apparatus includes a reception component 1104, a transmission component 1106, a beam management component 1108, a beam change instruction component 1110, and a sample acquisition component 1112.

The beam management component 1108 determines to change from a first beam to a second beam, and may signal the determination to change to the beam change instruction component 1110, at 1162. The beam change instruction component 1110 generates a beam change instruction to indicate the determination to change from the first beam to the second beam. The beam change instruction component 1110 transmits via a transmission component 1106, to a UE (e.g., the UE 1140), the beam change instruction in a DCI, at 1164 and 1162.

In an aspect, the DCI is an SPS DCI. In an aspect, the SPS DCI is independent from a physical downlink shared channel (PDSCH). In an aspect, the SPS DCI has a different bit pattern than other DCIs. In an aspect, the beam change instruction component 1110 determines whether or not the beam change instruction is detected by receiving from the UE, an ACK indicating that the SPS DCI is received by the UE 1040 or a NACK indicating that the SPS DCI is not received by the UE 1040.

In an aspect, the DCI is for DL grant. The beam change instruction component 1110 determines whether or not the beam change instruction is detected by receiving, via the reception component 1104, an indication that the beam change instruction is detected, from the UE 1140, at 1168 and 1170, where the determining whether or not the beam change instruction is detected is based on the indication. In an aspect, the indication is received via a PUCCH, the PUCCH being associated with the DCI for the DL grant. In one aspect, the indication may include the PUCCH scrambled with a beam change scrambling code indicating that the beam change instruction is detected by the UE. In such an aspect, the beam change scrambling code is different from a scrambling code used by the UE to transmit a PUCCH if the beam change instruction is not detected in the DCI. In another aspect, the indication may include the PUCCH including a beam change DMRS sequence indicating that the beam change instruction is detected by the UE. In such an aspect, the beam change DMRS sequence is different from a DMRS sequence used by the UE to transmit a PUCCH if the beam change instruction is not detected in the DCI. In another aspect, the indication includes a tri-state indicator indicating one of: successful decoding of the DCI and failure of a cyclic redundancy check (CRC) for a PDSCH when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded. In another aspect, the indication includes a DCI bit included in the PUCCH to indicate whether the DCI is successfully decoded.

The beam change instruction component 1110 determines whether or not the beam change instruction is detected by the UE 1140, and may signal the determination to the beam management component 1108, at 1172. The beam management component 1108 may change from the first beam to the second beam upon determining that the beam change instruction is detected by the UE.

In an aspect, the DCI may be for UL grant. In an aspect, the beam change instruction component 1110 determines whether or not the beam change instruction is detected by the UE 1040 further by receiving, via the reception component 1104, an uplink transmission indicating that the UE has detected the beam change instruction, and decoding the uplink transmission to determine whether or not the beam change instruction is detected. In another aspect, the beam change instruction component 1110 determines whether or not the beam change instruction is detected further by receiving, via the reception component 1104, an uplink transmission indicating that the UE has detected the beam change instruction, and detecting an energy of the uplink transmission to determine whether or not the beam change instruction is detected. In such an aspect, the beam change instruction component 1110 determines that the beam change instruction is detected if the detected energy of the uplink transmission is greater than an energy threshold. In another aspect, the beam change instruction component 1110 determines whether or not the beam change instruction is detected further by receiving, via the reception component 1104, an uplink transmission indicating that the UE has detected the beam change instruction, and decoding a DMRS included in the uplink transmission, the DMRS indicating that the beam change instruction is detected.

In an aspect, the beam change instruction component 1110 transmits, via the transmission component 1106, the beam change instruction by transmitting a PDCCH including the DCI that is for uplink grant or downlink grant or is communicated via SPS.

Following is another approach according to an aspect of the disclosure. The beam change instruction component 1110 transmits, via the transmission component 1106, a beam change instruction in a DCI using a first beam (e.g., to the UE 1140), at 1164 and 1166. The sample acquisition component 1112 receives, via the reception component 1104, a first sample signal using the first beam, at 1168 and 1174. The sample acquisition component 1112 receives, via the reception component 1104, a second sample signal using a second beam indicated by the beam change instruction, at 1174. The sample acquisition component 1112 may be forwarded information about the first and second sample singles to the beam management component 1108, at 1176. The beam management component 1108 selects one of the first beam and the second beam based on the first sample signal and the second sample signal. In an aspect, the first sample signal and the second sample signal are received in a subframe specified to the UE in the DCI.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
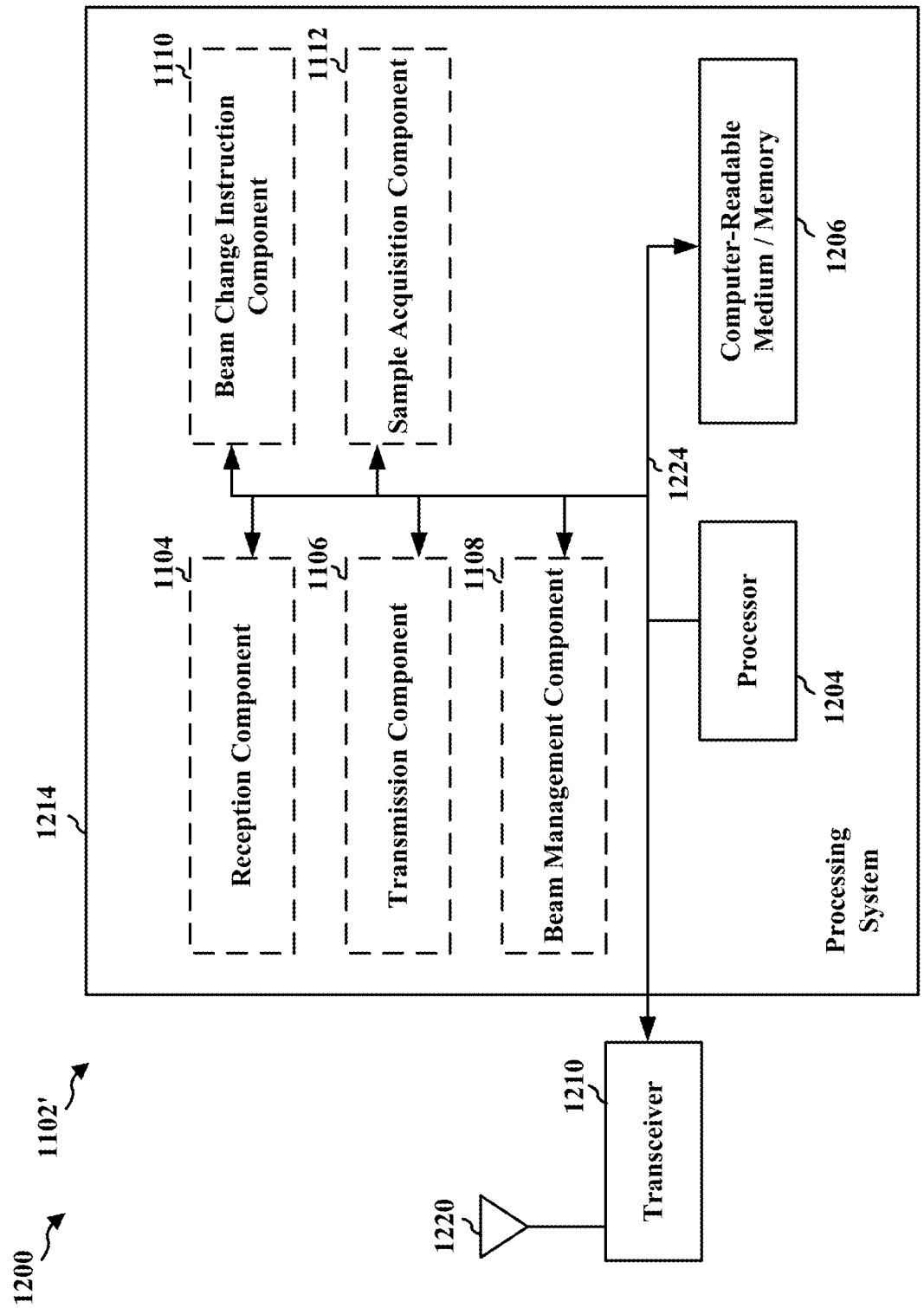
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375.

In one configuration, the apparatus 1102/1102' for wireless communication includes means for determining to change from a first beam to a second beam, means for generating a beam change instruction to indicate the determination to change from the first beam to the second beam, means for transmitting, to a UE, the beam change instruction in a DCI, and means for determining whether or not the beam change instruction is detected by the UE. In an aspect, the apparatus 1102/1102' may further include means for changing from the first beam to the second beam upon determining that the beam change instruction is detected by the UE.

In an aspect, the means for determining whether or not the beam change instruction is detected is configured to receive an uplink transmission indicating that the UE has detected the beam change instruction. In one aspect, the means for determining whether or not the beam change instruction is detected is further configured to receive an uplink transmission indicating that the UE has detected the beam change instruction, and decode the uplink transmission to determine whether or not the beam change instruction is detected. In another aspect, the means for determining whether or not the beam change instruction is detected is further configured to receive an uplink transmission indicating that the UE has detected the beam change instruction, and detect an energy of the uplink transmission to determine whether or not the beam change instruction is detected. In an aspect, the means for determining whether or not the beam change instruction is detected is configured to determine that the beam change instruction is detected if the detected energy of the uplink transmission is greater than an energy threshold. In another aspect, the means for determining whether or not the beam change instruction is detected is further configured to receive an uplink transmission indicating that the UE has detected the beam change instruction, and decode a DMRS included in the uplink transmission, the DMRS indicating that the beam change instruction is detected.

In an aspect, the means for determining whether or not the beam change instruction is detected is configured to receive from the UE, an ACK indicating that the SPS DCI is received by the UE or a NACK indicating that the SPS DCI is not received by the UE. In an aspect, the means for transmitting the beam change instruction is configured to transmit a PDCCH including the DCI that is for uplink grant or downlink grant or is communicated via SPS.

In an aspect, the means for determining whether or not the beam change instruction is detected may be configured to receive an indication that the beam change instruction is detected, where the determining whether or not the beam change instruction is detected is based on the indication.

In another configuration, the apparatus 1102/1102' for wireless communication includes means for transmitting a beam change instruction in a DCI using a first beam, means for receiving a first sample signal using the first beam, means for receiving a second sample signal using a second beam indicated by the beam change instruction, and means for selecting one of the first beam and the second beam based on the first sample signal and the second sample signal.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
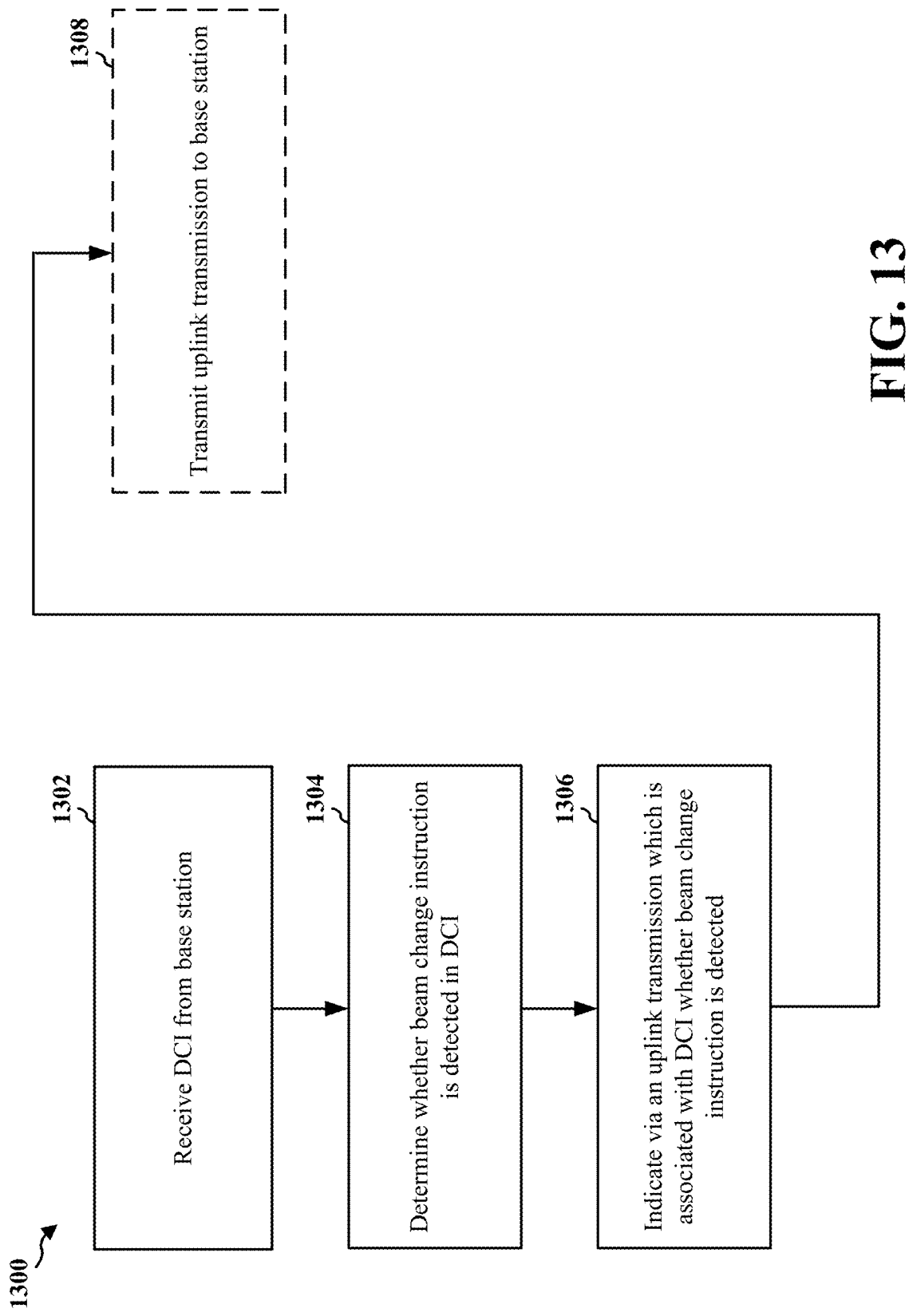
FIG. 13 is a flowchart of a method of wireless communication, according to an aspect of the disclosure.

FIG. 13 is a flowchart 1300 of a method of wireless communication. The method may be performed by a UE (e.g., the UE 702, the UE 802, the apparatus 1402/1402'). At 1302, the UE receives a DCI from a base station. At 1304, the UE determines whether a beam change instruction is detected in the DCI. At 1306, the UE indicates via an uplink transmission which is associated with the DCI whether the beam change instruction is detected, the uplink transmission including at least one of a PUCCH or a PUSCH. In an aspect, the PUCCH may include an ACK to indicate successful decoding of the DCI or a NACK to indicate unsuccessful decoding of the DCI. At 1308, the UE transmits the uplink transmission to the base station. For example, as discussed supra, when the base station generates a beam change instruction to indicate that the base station will change from the current beam to another beam, the base station transmits the beam change instruction in DCI to the UE. For example, as discussed supra, when the UE receives DCI from the base station, the UE decodes the DCI to attempt to detect a beam change instruction in the DCI. Subsequently, for example, as discussed supra, the UE may indicate to the base station whether the UE has detected the beam change instruction, such that the base station may determine whether the UE has detected the beam change instruction based on the indication. For example, FIGS. 7A-7D illustrate that a PUCCH or a PUSCH may be used to indicate whether the beam change instruction is detected by the UE.

In an aspect, the UE may receive the DCI by receiving at least one of a DCI for uplink grant including the beam change instruction, a DCI for downlink grant including the beam change instruction, or a SPS DCI including the beam change instruction. In such an aspect, the UE may transmit the uplink transmission by transmitting an ACK indicating that the beam change instruction is detected or a NACK indicating that the beam change instruction is not detected when the SPS DCI grant is received. In such an aspect, the receiving at least one of the DCI for uplink grant, the DCI for downlink grant, or the SPS DCI includes receiving a PDCCH including at least one of the DCI for uplink grant, the DCI for downlink grant, or the SPS DCI. In such an aspect, the SPS DCI is independent from a PDSCH. For example, as illustrated in FIG. 7A, the UE 702 attempts to decode the DCI for an uplink grant to detect the beam change instruction at 714, and the UE 702 transmits at 716 an indication to indicate whether the beam change instruction is detected via a PUSCH, and at 718, based on the indication from the UE 702. For example, as illustrated in FIG. 7B, the 702 attempts to decode the SPS type DCI to detect the beam change instruction at 734, and the UE 702 transmits at 736 an indication (e.g., a separate ACK/NACK) to indicate whether the beam change instruction is detected to the base station 704 via a PUCCH, where the indication is a separate indication for the PDDCH carrying the SPS type DCI.

In an aspect, the UE indicates via the uplink transmission that the beam change instruction is detected by scrambling the PUCCH with a beam change scrambling code indicating that the beam change instruction is detected. In such an aspect, the beam change scrambling code is different from a scrambling sequence used by the UE to transmit a PUCCH if the beam change instruction is not detected in the DCI. For example, as illustrated in FIG. 7C, at 756, if the UE 702 successfully decodes the DCI to detect the beam change instruction, the UE scrambles the PUCCH with a distinct scrambling code to indicate that the beam change instruction is detected, and the UE 702 transmits at 758 the scrambled PUCCH. For example, as discussed supra, because the distinct scrambling code is used when the beam switching command is detected, the PUCCH scrambled with the distinct scrambling code indicates to the base station that the beam switching command is detected.

In an aspect, the UE indicates via the uplink transmission that the beam change instruction is detected by including a beam change DMRS sequence in the PUCCH indicating that the beam change instruction is detected. In such an aspect, the beam change DMRS sequence is different from a DMRS sequence used by the UE to transmit a PUCCH if the beam change instruction is not detected in the DCI. For example, as illustrated in FIG. 7D, at 776, if the UE 702 successfully decodes the DCI to detect the beam change instruction, the UE includes a distinct DMRS sequence in the PUCCH to indicate that the beam change instruction is detected, and the UE 702 transmits at 778 the PUCCH with the distinct DMRS sequence. For example, as discussed supra, the distinct DMRS sequence is different from a DMRS sequence used by the UE to transmit the PUCCH if the beam change instruction is not detected in the DCI.

In an aspect, the UE indicates via the uplink transmission that the beam change instruction is detected by including a tri-state indicator in the PUCCH to indicate one of: successful decoding of the DCI and failure of a CRC for a PDSCH when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded. As illustrated in FIG. 8A, At 816, the UE 802 generates a tri-state indicator including one of the three indications, where the three indications may include the first indication that the DCI has been successfully decoded and the CRC for a PDSCH has failed, the second indication that the DCI has been successfully decoded and the CRC for the PDSCH has passed, and the third indication that the DCI has not been successfully decoded, and the UE 802 transmits at 818 the tri-state indication.

In an aspect, the UE indicates via the uplink transmission that the beam change instruction is detected by including a DCI bit in the PUCCH to indicate whether the DCI is successfully decoded. For example, as illustrated in FIG. 8B, at 836, the UE 802 includes a bit in a PUCCH to separately indicate an ACK/NACK response for successful decoding of the DCI and detection of the beam change instruction, and the UE 802 transmits at 838 the PUCCH with the bit.

Figure 14:
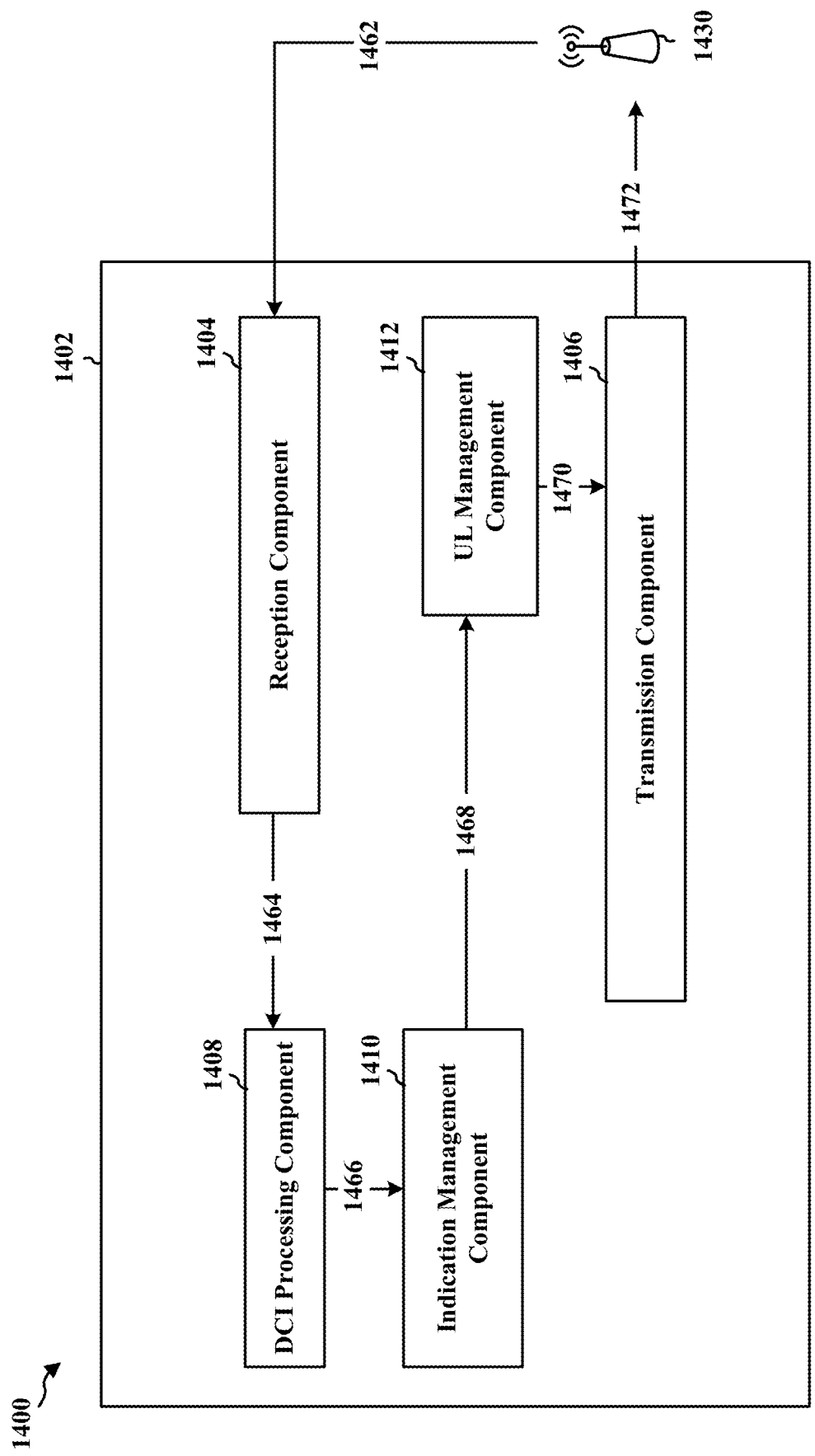
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus includes a reception component 1404, a transmission component 1406, and a DCI processing component 1408, an indication management component 1410, and a UL management component 1412.

The DCI processing component 1408 receives, via the reception component 1404, a DCI from a base station (e.g., base station 1450), at 1462 and 1464. The DCI processing component 1408 determines whether a beam change instruction is detected in the DCI, and may signal the determination result to the indication management component 1414, at 1466. The indication management component 1414 indicates via an uplink transmission which is associated with the DCI whether the beam change instruction is detected, the uplink transmission including at least one of a PUCCH or a PUSCH, and may communicate the PUCCH to the UL management component 1412 at 1468. In an aspect, the UL management component 1412 may transmit, via the transmission component 1406, the uplink transmission to the base station, at 1470 and 1472. In an aspect, the PUCCH includes an ACK to indicate successful decoding of the DCI or a NACK to indicate unsuccessful decoding of the DCI.

In an aspect, the DCI processing component 1408 may receive the DCI by receiving at least one of a DCI for uplink grant including the beam change instruction, a DCI for downlink grant including the beam change instruction, or a SPS DCI including the beam change instruction. In such an aspect, at 1310, the indication management component 1414 and the UL management component 1412 may transmit the uplink transmission by transmitting, via the transmission component 1470, an ACK indicating that the beam change instruction is detected or a NACK indicating that the beam change instruction is not detected when the SPS DCI grant is received. In such an aspect, the receiving at least one of the DCI for uplink grant, the DCI for downlink grant, or the SPS DCI includes receiving a PDCCH including at least one of the DCI for uplink grant, the DCI for downlink grant, or the SPS DCI. In such an aspect, the SPS DCI is independent from a PDSCH.

In an aspect, the indication management component 1414 indicates via the uplink transmission that the beam change instruction is detected by scrambling the PUCCH with a beam change scrambling code indicating that the beam change instruction is detected. In such an aspect, the beam change scrambling code is different from a scrambling sequence used by the UE to transmit a PUCCH if the beam change instruction is not detected in the DCI.

In an aspect, the indication management component 1414 indicates via the uplink transmission that the beam change instruction is detected by including a beam change DMRS sequence in the PUCCH indicating that the beam change instruction is detected. In such an aspect, the beam change DMRS sequence is different from a DMRS sequence used by the UE to transmit a PUCCH if the beam change instruction is not detected in the DCI.

In an aspect, the indication management component 1414 indicates via the uplink transmission that the beam change instruction is detected by including a tri-state indicator in the PUCCH to indicate one of: successful decoding of the DCI and failure of a CRC for a PDSCH when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded.

In an aspect, the indication management component 1414 indicates via the uplink transmission that the beam change instruction is detected by including a DCI bit in the PUCCH to indicate whether the DCI is successfully decoded.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
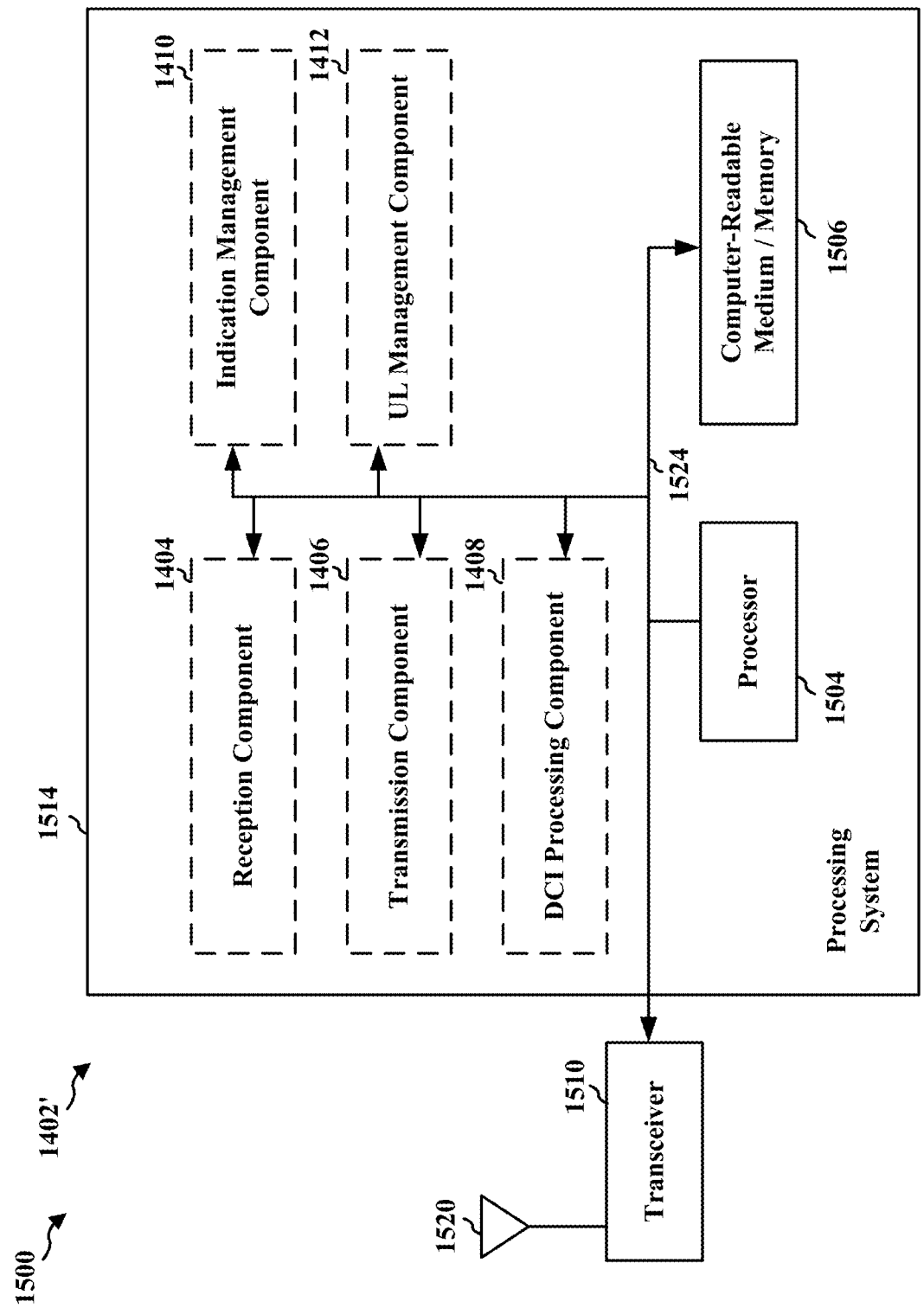
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving a DCI from a base station, means for determining whether a beam change instruction is detected in the DCI, and means for indicating via an uplink transmission which is associated with the DCI whether the beam change instruction is detected, the uplink transmission including at least one of a PUCCH or a PUSCH, and means for transmitting the uplink transmission to the base station.

In an aspect, the means for indicating via the uplink transmission is configured to scramble the PUCCH with a beam change scrambling code indicating that the beam change instruction is detected. In an aspect, the means for indicating via the uplink transmission is configured to include a beam change DMRS sequence in the PUCCH indicating that the beam change instruction is detected. In an aspect, the means for indicating via the uplink transmission is configured to include a tri-state indicator in the PUCCH to indicate one of: successful decoding of the DCI and failure of a CRC for a PDSCH when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded. In an aspect, the means for indicating in the PUCCH is configured to include a DCI bit in the PUCCH to indicate whether the DCI is successfully decoded.

In an aspect, the means for receiving the DCI comprises means for receiving at least one of a DCI for uplink grant including the beam change instruction, a DCI for downlink grant including the beam change instruction, or a SPS DCI including the beam change instruction. In such an aspect, the means for transmitting the uplink transmission may be configured to transmit an ACK indicating that the beam change instruction is detected or a NACK indicating that the beam change instruction is not detected when the SPS DCI grant is received. In such an aspect, the means for receiving at least one of the DCI for uplink grant, the DCI for downlink grant, or the SPS DCI is configured to receive a PDCCH including at least one of the DCI for uplink grant, the DCI for downlink grant, or the SPS DCI.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   determining to change from a first beam to a second beam;
   generating a beam change instruction to indicate the determination to change from the first beam to the second beam;
   transmitting, to a user equipment (UE), the beam change instruction in a downlink control information (DCI); and
   determining whether or not the beam change instruction is detected by the UE, wherein the determining whether or not the beam change instruction is detected comprises:
   receiving an uplink transmission from the UE, the uplink transmission associated with the DCI and indicating that the beam change instruction is received and that a data transmission is successfully received, wherein the uplink transmission includes a beam change demodulation reference signal (DMRS) sequence or a tri-state indicator.

2. The method of claim 1, wherein the first beam and the second beam are transmit beams or receive beams.

3. The method of claim 1, further comprising:
   changing from the first beam to the second beam upon determining that the beam change instruction is detected by the UE.

4. The method of claim 1, wherein the DCI is transmitted for a downlink (DL) grant.

5. The method of claim 1, where the DCI is a semi-persistent scheduling (SPS) DCI transmitted via SPS.

6. The method of claim 5, wherein the SPS DCI is independent from a physical downlink shared channel (PDSCH).

7. The method of claim 5, wherein the SPS DCI has a different bit pattern than other DCIs.

8. The method of claim 5, wherein the determining whether or not the beam change instruction is detected comprises:
   receiving from the UE, an acknowledgement (ACK) indicating that the SPS DCI is received by the UE.

9. The method of claim 1, wherein the transmitting the beam change instruction comprises:
   transmitting a physical downlink control channel (PDCCH) including the DCI that is for an uplink grant or for a downlink grant, or is communicated via semi-persistent scheduling (SPS).

10. The method of claim 1, wherein the determining whether or not the beam change instruction is detected comprises:
    receiving an indication in the uplink transmission that the beam change instruction is detected,
    wherein the determining whether or not the beam change instruction is detected is based on the indication.

11. The method of claim 10, wherein the indication is received via a physical uplink control channel (PUCCH), the PUCCH being associated with the DCI for a downlink grant.

12. The method of claim 11, wherein the indication comprises:
    the PUCCH scrambled with a beam change scrambling code indicating that the beam change instruction is detected by the UE.

13. The method of claim 12, wherein the beam change scrambling code is different from a scrambling code used by the UE to transmit a PUCCH if the beam change instruction is not detected in the DCI.

14. The method of claim 11, wherein the indication comprises:
    the PUCCH including the beam change DMRS sequence indicating that the beam change instruction is detected by the UE.

15. The method of claim 14, where the beam change DMRS sequence is different from a DMRS sequence used by the UE to transmit a PUCCH if the beam change instruction is not detected in the DCI.

16. The method of claim 11, wherein the indication comprises:
    a DCI bit included in the PUCCH to indicate whether the DCI is successfully decoded.

17. The method of claim 10, wherein the indication comprises the tri-state indicator indicating one of:

successful decoding of the DCI and failure of a cyclic redundancy check (CRC) for a physical downlink shared channel (PDSCH) when the DCI is successfully decoded and the CRC for the PDSCH fails, successful decoding of the DCI and a pass of the CRC for the PDSCH when the DCI is successfully decoded and the CRC for the PDSCH passes, and unsuccessful decoding of the DCI when the DCI is not successfully decoded.

18. A method of wireless communication of a user equipment (UE), comprising:
receiving a downlink control information (DCI) from a base station;
determining that a beam change instruction is detected in the DCI; and
indicating via an uplink transmission which is associated with the DCI that the beam change instruction is detected and that a data transmission is successfully received, the uplink transmission including at least one of a physical uplink control channel (PUCCH) or a physical uplink shared channel (PUSCH), wherein the uplink transmission includes a beam change demodulation reference signal (DMRS) sequence or a tri-state indicator.

19. The method of claim 18, wherein the PUCCH includes an acknowledgement (ACK) to indicate successful decoding of the DCI.

20. The method of claim 18, wherein the indicating via the uplink transmission comprises:
scrambling the PUCCH with a beam change scrambling code indicating that the beam change instruction is detected.

21. The method of claim 20, wherein the beam change scrambling code is different from a scrambling sequence used by the UE to transmit a PUCCH if the beam change instruction is not detected in the DCI.

22. The method of claim 18, wherein the indicating via the uplink transmission comprises:
including the beam change DMRS sequence in the PUCCH indicating that the beam change instruction is detected.

23. The method of claim 22, where the beam change DMRS sequence is different from a DMRS sequence used by the UE to transmit a PUCCH if the beam change instruction is not detected in the DCI.

24. The method of claim 18, wherein the indicating via the uplink transmission comprises including the tri-state indicator in the uplink transmission to indicate one of:
successful decoding of the DCI and failure of a cyclic redundancy check (CRC) for a physical downlink shared channel (PDSCH) when the DCI is successfully decoded and the CRC for the PDSCH fails;
successful decoding of the DCI and a pass of the CRC for the PDSCH when the DCI is successfully decoded and the CRC for the PDSCH passes, and
unsuccessful decoding of the DCI when the DCI is not successfully decoded.

25. The method of claim 18, wherein the indicating via the uplink transmission comprises:
including a DCI bit in the PUCCH to indicate whether the DCI is successfully decoded.

26. The method of claim 18, wherein the receiving the DCI comprises:
receiving at least one of a DCI for an uplink grant including the beam change instruction, a DCI for a downlink grant including the beam change instruction, or a semi-persistent scheduling (SPS) DCI including the beam change instruction.

27. The method of claim 26, wherein the indicating via the uplink transmission comprises:
transmitting an acknowledgement (ACK) indicating that the beam change instruction is detected.

28. The method of claim 26, wherein the receiving at least one of the DCI for the uplink grant, the DCI for the downlink grant, or the SPS DCI comprises:
receiving a physical downlink control channel (PDCCH) including at least one of the DCI for uplink grant, the DCI for downlink grant, or the SPS DCI.

29. An apparatus for wireless communication of a base station, comprising:
a memory; and
at least one processor coupled to the memory and configured to:
determine to change from a first beam to a second beam;
generate a beam change instruction to indicate the determination to change from the first beam to the second beam;
transmit, to a user equipment (UE), the beam change instruction in a downlink control information (DCI); and
determine whether or not the beam change instruction is detected by the UE, wherein to determine whether or not the beam change instruction is detected comprises the at least one processor configured to:
receive an uplink transmission from the UE, the uplink transmission associated with the DCI and indicating that the beam change instruction is received and that a data transmission is successfully received, wherein the uplink transmission includes a beam change demodulation reference signal (DMRS) sequence or a tri-state indicator.

30. An apparatus for wireless communication of a user equipment (UE), comprising:
a memory; and
at least one processor coupled to the memory and configured to:
receive a downlink control information (DCI) from a base station;
determine that a beam change instruction is detected in the DCI; and
indicate via an uplink transmission which is associated with the DCI that the beam change instruction is detected and that a data transmission is successfully received, the uplink transmission including at least one of a physical uplink control channel (PUCCH) or a physical uplink shared channel (PUSCH), wherein the uplink transmission includes a beam change demodulation reference signal (DMRS) sequence or a tri-state indicator.

* * * * *